United States Patent
Kim et al.

(10) Patent No.: US 9,214,818 B2
(45) Date of Patent: Dec. 15, 2015

(54) WIRELESS POWER TRANSMISSION SYSTEM, AND METHOD OF CONTROLLING TRANSMISSION AND RECEPTION OF RESONANCE POWER

(75) Inventors: Nam Yun Kim, Seoul (KR); Sang Wook Kwon, Seongnam-si (KR); Yun Kwon Park, Dongducheon-si (KR); Eun Seok Park, Yongin-si (KR); Young Tack Hong, Seongnam-si (KR); Young Ho Ryu, Yongin-si (KR); Dong Zo Kim, Yongin-si (KR); Jin Sung Choi, Gimpo-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 381 days.

(21) Appl. No.: 13/293,435

(22) Filed: Nov. 10, 2011

(65) Prior Publication Data

US 2012/0112554 A1   May 10, 2012

(30) Foreign Application Priority Data

Nov. 10, 2010   (KR) .................. 10-2010-0111304

(51) Int. Cl.
| | |
|---|---|
| H01F 27/42 | (2006.01) |
| H01F 37/00 | (2006.01) |
| H01F 38/00 | (2006.01) |
| H02J 5/00 | (2006.01) |
| H02J 17/00 | (2006.01) |

(52) U.S. Cl.
CPC ........ *H02J 5/005* (2013.01); *H02J 17/00* (2013.01)

(58) Field of Classification Search
CPC .................. H02J 5/005; H02J 17/00
USPC .......................................... 307/104; 320/108
See application file for complete search history.

(56) References Cited

U.S. PATENT DOCUMENTS

| | | | | |
|---|---|---|---|---|
| 8,299,652 B2 * | 10/2012 | Sample et al. | ............... | 307/104 |
| 8,378,524 B2 * | 2/2013 | Mita | ............... | 307/104 |
| 8,497,658 B2 * | 7/2013 | Von Novak et al. | .......... | 320/108 |

(Continued)

FOREIGN PATENT DOCUMENTS

| | | |
|---|---|---|
| CN | 101645619 A | 2/2010 |
| CN | 101667754 A | 3/2010 |

(Continued)

OTHER PUBLICATIONS

International Search Report issued May 24, 2012 in counterpart Information Application No. PCT/KR2011/008517 (4 pages, in English).

(Continued)

*Primary Examiner* — Rexford Barnie
*Assistant Examiner* — Rasem Mourad
(74) *Attorney, Agent, or Firm* — NSIP Law

(57) ABSTRACT

A resonance power transmission system, and a method of controlling transmission and reception of a resonance power are provided. According to one embodiment, a method of controlling resonance power transmission in a resonance power transmitter may include: transmitting resonance power to a resonance power receiver, the resonance power having resonance frequencies which vary with respect to a plurality of time intervals; and receiving, from the resonance power receiver, information regarding the resonance frequency having the highest power transmission efficiency among the resonance frequencies used in the time intervals.

23 Claims, 24 Drawing Sheets

(56) References Cited

U.S. PATENT DOCUMENTS

| | | | |
|---|---|---|---|
| 8,547,057 B2* | 10/2013 | Dunworth et al. | 320/108 |
| 2003/0078634 A1* | 4/2003 | Schulman et al. | 607/61 |
| 2004/0130915 A1* | 7/2004 | Baarman | 363/21.02 |
| 2005/0151511 A1* | 7/2005 | Chary | 320/127 |
| 2009/0174263 A1* | 7/2009 | Baarman et al. | 307/104 |
| 2010/0036773 A1* | 2/2010 | Bennett | 705/67 |
| 2010/0052431 A1 | 3/2010 | Mita | |
| 2011/0018360 A1* | 1/2011 | Baarman et al. | 307/104 |
| 2011/0080051 A1* | 4/2011 | Lee et al. | 307/104 |
| 2011/0130093 A1* | 6/2011 | Walley et al. | 455/41.1 |

FOREIGN PATENT DOCUMENTS

| | | |
|---|---|---|
| JP | 2006-109673 | 4/2006 |
| JP | 2009-239640 A | 10/2009 |
| JP | 2010-098878 A | 4/2010 |
| JP | 2010-239781 A | 10/2010 |
| KR | 10-2005-0105200 A | 11/2005 |
| KR | 10-2010-0012944 | 2/2010 |
| KR | 10-2010-0082030 | 7/2010 |
| WO | WO 2009/089253 A1 | 7/2009 |
| WO | WO 2009/140220 A1 | 11/2009 |
| WO | WO 2010/085701 A2 | 7/2010 |

OTHER PUBLICATIONS

Chinese Office Action issued Dec. 31, 2014 in counterpart Chinese Application No. CN 201180064045.X (29 pages, in Chinese, with English translation).

Japanese Office Action issued on Jul. 21, 2015 in counterpart Japanese Application No. 2013-538641 (17 pages, with English translation).

* cited by examiner

WIRELESS POWER TRANSMISSION SYSTEM, AND METHOD OF CONTROLLING TRANSMISSION AND RECEPTION OF RESONANCE POWER

CROSS-REFERENCE TO RELATED APPLICATION(S)

This application claims the benefit under 35 U.S.C. §119 (a) of Korean Patent Application No. 10-2010-0111304, filed on Nov. 10, 2010, in the Korean Intellectual Property Office, the entire disclosure of which is incorporated herein by reference for all purposes.

BACKGROUND

1. Field

The following description relates to wireless power transmission.

2. Description of Related Art

Resonance power refers to a type of electromagnetic energy that is wirelessly transmitted. A typical resonance power transmission system includes a source electronic device and a target electronic device. The resonance power may be transferred from the source electronic device to the target electronic device. More particularly, the source electronic device may transmit resonance power, and the target electronic device may receive the resonance power. The source electronic device and the target electronic device may be referred to as a resonance power transmitter and a resonance power receiver, respectively.

Due to characteristics of a wireless environment, the distance between a source resonator and a target resonator may be highly likely to vary over time, and matching requirements to match the source resonator and the target resonator may also change.

SUMMARY

According to one aspect, a method of controlling resonance power transmission in a resonance power transmitter may include: transmitting resonance power to a resonance power receiver, the resonance power having resonance frequencies which vary with respect to a plurality of time intervals; and receiving, from the resonance power receiver, information regarding the resonance frequency having a highest power transmission efficiency among the resonance frequencies used in the time intervals.

The method may further include: detecting the resonance power receiver. The detecting may include: receiving an identifier (ID) of the resonance power receiver; and recognizing the resonance power receiver based on the received ID.

The method may further include: notifying the resonance power receiver of the resonance frequencies used in the time intervals, and of a power amount of the resonance power transmitted in one or more of the time intervals.

The method my further include: generating the resonance power using the resonance frequency having the highest power transmission efficiency; and transmitting the generated resonance power to the resonance power receiver.

One or more of the resonance frequencies used in the time intervals may be determined by scanning a frequency characteristic of a reflected wave, determined based on a channel of a predetermined width, or randomly determined in a predetermined bandwidth.

The time intervals may include preset or predetermined time intervals.

According to another aspect, a method of controlling resonance power transmission in a resonance power transmitter may include: determining an order of a plurality of resonance power receivers; transmitting first resonance power to a first resonance power receiver of the plurality of resonance power receivers based on the determined order, the first resonance power having resonance frequencies which vary for a plurality of time intervals; receiving a first resonance frequency from the first resonance power receiver, the first resonance frequency having the highest power transmission efficiency for the first resonance power receiver among resonance frequencies used in the time intervals; transmitting second resonance power to a second resonance power receiver of the plurality of resonance power receivers based on the determined order, the second resonance power having a resonance frequency variable for of time intervals; and receiving a second resonance frequency from the second resonance power receiver, the second resonance frequency having the highest power transmission efficiency for the second resonance power receiver among the resonance frequencies used in the time intervals.

The method may further include: detecting the plurality of resonance power receivers.

The method may further include: generating the first resonance power using the first resonance frequency, and transmitting the first resonance power generated using the first resonance frequency to the first resonance power receiver in a first time interval; and generating the second resonance power using the second resonance frequency, and transmitting the second resonance power generated using the second resonance frequency to the second resonance power receiver in a second time interval.

The method may further include: generating the first resonance power using the first resonance frequency, and transmitting the first resonance power generated using the first resonance frequency to the first resonance power receiver; determining whether charging of the first resonance power receiver is completed; and generating the second resonance power using the second resonance frequency, and transmitting the second resonance power generated using the second resonance frequency to the second resonance power receiver, when the charging of the first resonance power receiver is completed.

The method may further include: generating the first resonance power using the first resonance frequency, and transmitting the first resonance power generated using the first resonance frequency to the first resonance power receiver; determining whether a report message is received from the first resonance power receiver within a predetermined period of time; and generating the second resonance power using the second resonance frequency, and transmitting the second resonance power generated using the second resonance frequency to the second resonance power receiver, when the report message is not received within the predetermined period of time.

One or more of the resonance frequencies used in the time intervals may be determined by scanning a frequency characteristic of a reflected wave, determined based on a channel of a predetermined width, or randomly determined in a predetermined bandwidth.

According to yet another aspect, a method of controlling resonance power reception in a resonance power receiver may include: receiving resonance power from the resonance power transmitter, the resonance power having resonance frequencies which vary for a plurality of time intervals; receiving information regarding resonance frequencies used in the time intervals; detecting a resonance frequency having the highest power transmission efficiency among the resonance frequencies used in the time intervals; and notifying the resonance power transmitter of the detected resonance frequency.

The method may further include: receiving, from the resonance power transmitter, resonance power generated using the detected resonance frequency.

The method may further include: determining whether charging of the resonance power receiver is completed; and notifying the resonance power transmitter of a completion of the charging of the resonance power receiver, when the charging of the resonance power receiver is completed.

According to still another aspect, a resonance power transmitter may include: a resonance power generator configured to generate the resonance power, wherein resonance frequencies of the resonance power vary for a plurality of time intervals; and a source resonator configured to transmit the resonance power to a resonance power receiver; a communication unit configured to receive, from the resonance power receiver, information regarding the resonance frequency having the highest power transmission efficiency among the resonance frequencies used in the time intervals.

The resonance power transmitter may further include: a detector configured to detect the resonance power receiver.

The resonance power generator may be configured to generate the resonance power using the resonance frequency having the highest power transmission efficiency, and the source resonator may be configured to transmit the generated resonance power to the resonance power receiver.

One or more of the resonance frequencies used in the time intervals may be determined by scanning a frequency characteristic of a reflected wave, determined based on a channel of a predetermined width, or randomly determined in a predetermined bandwidth.

According to a further aspect, a resonance power receiver may include: a target resonator configured to receive resonance power from a resonance power transmitter, the resonance power having resonance frequencies which vary for a plurality of time intervals; a communication unit configured to receive information regarding the resonance frequencies used in the time intervals; and a target controller configured to detect a resonance frequency having the highest power transmission efficiency among the resonance frequencies used in the time intervals, wherein the communication unit is configured to transmit the detected resonance frequency to the resonance power transmitter.

The target resonator may be configured to receive, from the resonance power transmitter, resonance power generated using the detected resonance frequency.

When charging of the resonance power receiver is completed, the target controller may be configured to notify the resonance power transmitter of a completion of the charging of the resonance power receiver.

Other features and aspects will be apparent from the following detailed description, the drawings, and the claims.

Figure 1:
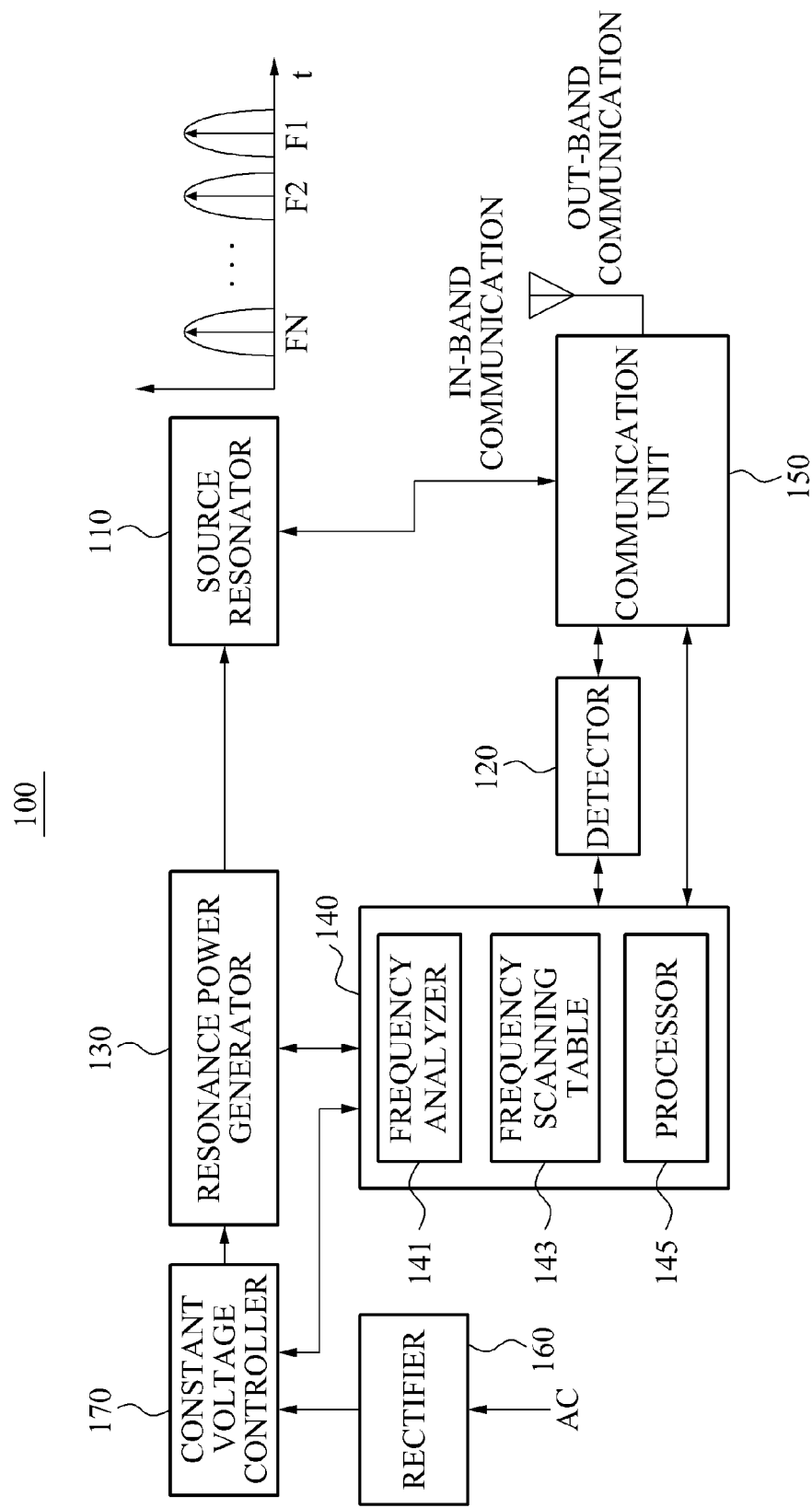
FIG. 1 is a diagram illustrating a resonance power transmitter.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 2:
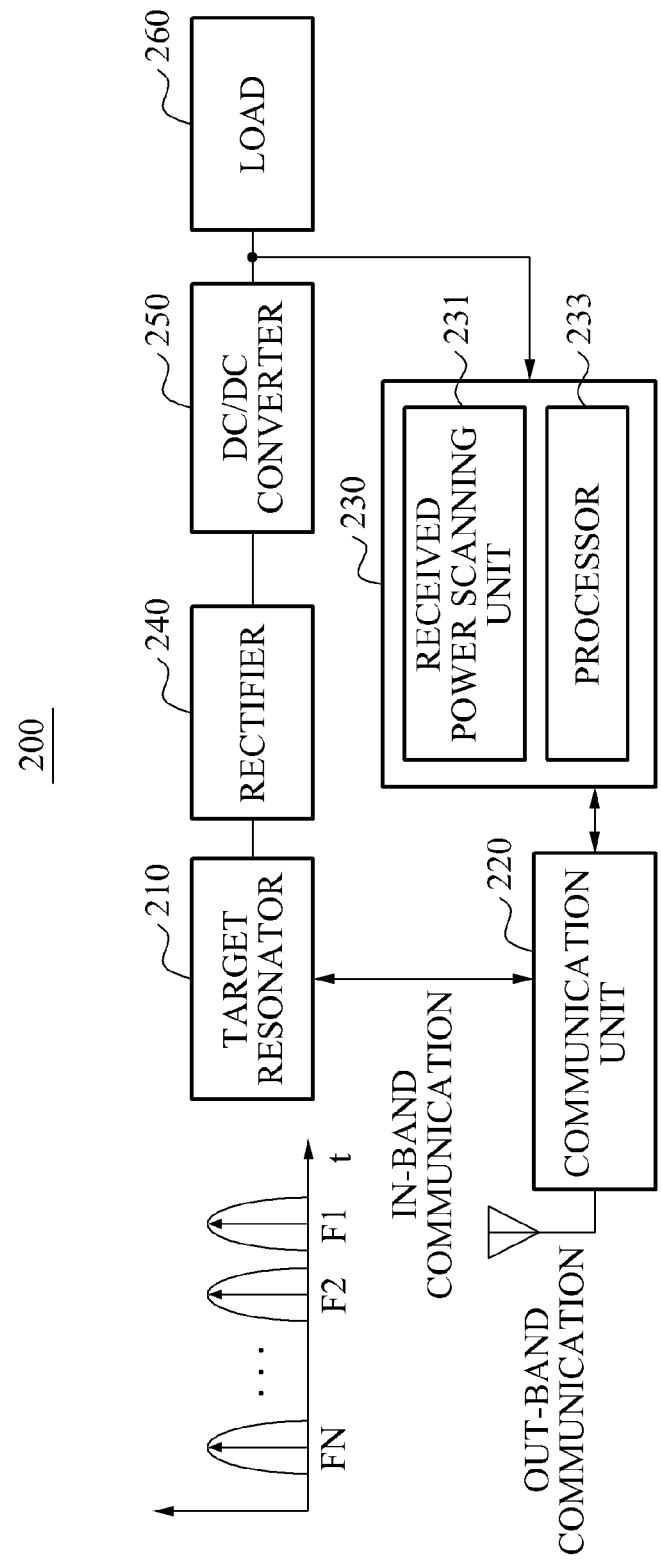
FIG. 2 is a diagram illustrating a resonance power receiver.

FIGS. 1 and 2 illustrate a resonance power transmitter 100 and a resonance power receiver 200, respectively, which together may form a wireless power transmission system.

FIG. 1 illustrates the resonance power transmitter 100. As shown in FIG. 1, the resonance power transmitter 100 may include a source resonator 110, a detector 120, a resonance power generator 130, a source controller 140, a communication unit 150 a rectifier 160, and a constant voltage controller 170.

FIG. 2 illustrates the resonance power receiver 200. As shown in FIG. 2, the resonance power receiver 200 may include a target resonator 210, a communication unit 220, a target controller 230 a rectifier 240, a direct current (DC)-to-DC (DC/DC) converter 250, and a load 260.

The source resonator 110 may be configured to transfer electromagnetic energy to the target resonator 210. For example, the source resonator 110 may transfer a resonance power to the resonance power receiver 200, through magnetic coupling with the target resonator 210. The source resonator 110 may resonate within a set resonance bandwidth.

The detector 120 may be configured to detect the resonance power receiver 200. For example, the detector 120 may detect the resonance power receiver 200, based on an identifier (ID) of the resonance power receiver 200 received from the resonance power receiver 200, for instance. When a resonance power needs to be received, the resonance power receiver 200 may transmit the ID to the resonance power transmitter 100. And, when the ID is received, the detector 120 may determine that the resonance power receiver 200 exists.

The resonance power generator 130 may be configured to generate resonance power under a control of the source controller 140. For instance, the resonance power generator 130 may convert a DC voltage of a predetermined level to an alternating current (AC), by a switching pulse signal (e.g., in a band of one or more megahertz (MHz) to tens of MHz). In some embodiments, the resonance power generator 130 may include an AC-to-DC (AC/DC) inverter. The DC voltage of the predetermined level may be provided from the constant voltage controller 170. The AC/DC inverter may include a switching device for high-speed switching, for instance. When the switching pulse signal is "high" (i.e., at or near its maximum), the switching device may be powered "ON." And when the switching pulse signal is "low" (i.e., at or near its minimum) the switching device may be powered "OFF."

The resonance power generator 130 may generate a resonance power, under the control of the source controller 140. The resonance power may have a resonance frequency which may vary for one or more time intervals. The time intervals may be preset or predetermined, for example. Additionally, under the control of the source controller 140, the resonance power generator 130 may generate the resonance power using the resonance frequency having the highest power transmission efficiency among a plurality of resonance frequencies for the time intervals. The source resonator 110 may transmit, to the resonance power receiver 200, the resonance power generated using the resonance frequency having the highest power transmission efficiency.

The source controller 140 may be configured to control the resonance power generator 130, so that the resonance frequency of the resonance power generated by the resonance power generator 130 may vary for one or more of the time intervals. Additionally, the source controller 140 may control an overall operation of the resonance power transmitter 100. The source controller 140 may be configured to control an operation of at least one of the detector 120, the resonance power generator 130, the communication unit 150, and the constant voltage controller 170. One or more of resonance frequencies used respectively in the time intervals may be determined by scanning a frequency characteristic of a reflected wave, or may be determined based on a channel with a predetermined width, or may be randomly determined in a predetermined bandwidth.

In some embodiments, the source controller 140 may include a frequency analyzer 141, a frequency scanning table 143, and a processor 145, as illustrated in FIG. 1.

Figure 9:
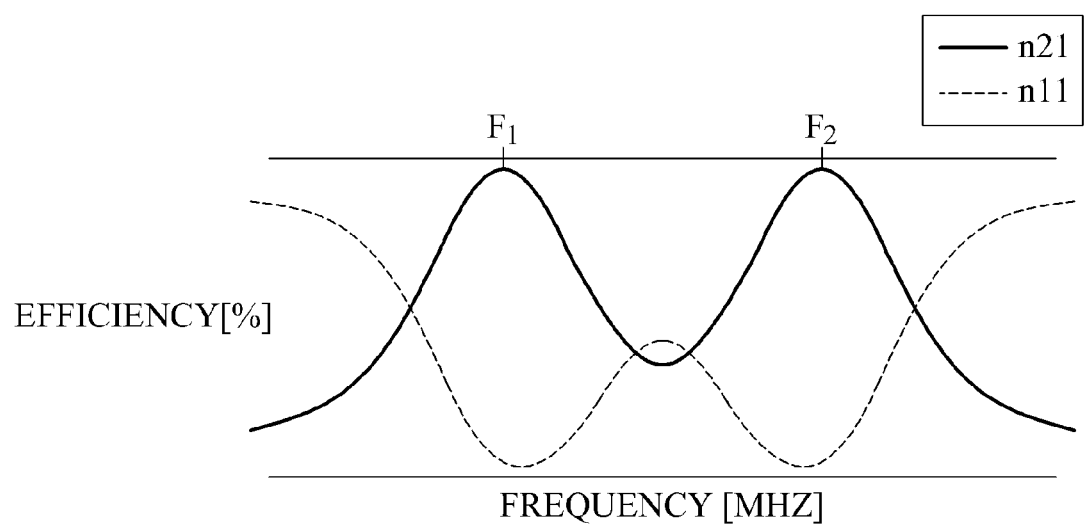
FIG. 9 is a diagram illustrating a frequency spectrum with respect to a transmitted power and a reflected power.

The frequency analyzer 141 may be configured to determine the resonance frequencies used respectively in the time intervals, through analysis of a frequency spectrum illustrated in FIG. 9. In a situation where a frequency spectrum is measured in a time interval T1, as illustrated in FIG. 9, the frequency analyzer 141 may determine a resonance frequency used in the time interval T1 to be a frequency "$F_1$" or "$F_2$." FIG. 9 illustrates one example of a frequency spectrum with respect to a transmitted power and a reflected power. In FIG. 9, "n21" represents a frequency spectrum for the transmitted power, and "n11" represents a frequency spectrum for the reflected power. In some instances, the reflected power may be measured by a reflected signal coupler.

The frequency scanning table 143 may record or otherwise store resonance frequencies that are variable based on a channel of a predetermined width, record resonance frequencies that are randomly variable, or both.

The processor 145 may be configured to manage and/or control functions of the source controller 140.

The communication unit 150 may transmit, to the resonance power receiver 200, the resonance frequencies used in the time intervals, and a power amount of a resonance power transmitted in one or more of the time intervals, under the control of the source controller 140. Additionally, the communication unit 150 may receive, from the resonance power receiver 200, the resonance frequency having the highest power transmission efficiency among the resonance frequencies used respectively in the time intervals.

The communication unit 150 may perform an in-band communication for transmitting or receiving data to or from the resonance power receiver 200 via a resonance frequency, and may perform an out-band communication for transmitting or receiving data to or from the resonance power receiver 200 via a frequency assigned for data communication.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The rectifier 160 may generate a DC voltage by rectifying an AC voltage (e.g., in a band of tens of Hz).

The constant voltage controller 170 may receive an input of the DC voltage from the rectifier 160, and may output a DC voltage of a predetermined level under the control of the source controller 140. The constant voltage controller 170 may include a stabilization circuit to output a DC voltage of a predetermined level, for instance.

The target resonator 210 may receive the electromagnetic energy from the source resonator 110. For example, the target resonator 210 may receive resonance power from the resonance power transmitter 100, through the magnetic coupling with the source resonator 110. The target resonator 210 may resonate within the set resonance bandwidth.

The communication unit 220 may transmit or receive data to or from the communication unit 150, under a control of the target controller 230. For example, the communication unit 220 may transmit the ID of the resonance power receiver 200 to the resonance power transmitter 100. Additionally, the communication unit 220 may receive information regarding the resonance frequencies used in the time intervals, and information on the power amount of the resonance power transmitted in one or more of the time intervals. Furthermore, the communication unit 220 may transmit, to the resonance power transmitter 100, the resonance frequency having the highest power transmission efficiency among the resonance frequencies used respectively in the time intervals. Similarly to the communication unit 150 in the resonance power transmitter 100, the communication unit 220 may perform the in-band communication and the out-band communication.

The target controller 230 may detect the resonance frequency having the highest power transmission efficiency among the resonance frequencies used in the time intervals.

Table 1, below, shows power amounts P1, P2, P3, and P4 of resonance powers received respectively in time intervals T1, T2, T3, and T4, and pieces of data received from the resonance power transmitter 100. It should be appreciated that the specific values shown in Table 1 are merely an example and that other values are possible. The target controller 230 may detect a frequency F3 as the resonance frequency having the highest power transmission efficiency.

TABLE 1

|  | T1 | T2 | T3 | T4 |
|---|---|---|---|---|
| Used resonance frequency | F1 (13.56 MHz) | F2 (13.65 MHz) | F3 (13.60 MHz) | F4 (13.56 MHz) |
| Amount of resonance power transmitted | 100 watt (W) | 100 W | 100 W | 100 W |
| Amount of resonance power received | P1 (80 W) | P2 (85 W) | P3 (92 W) | P4 (90 W) |

The target controller 230 may be configured to control or otherwise direct the communication unit 220 to transmit, to the resonance power transmitter 100, the resonance frequency having the highest power transmission efficiency among the resonance frequencies used respectively in the time intervals. Under the control of the target controller 230, the communication unit 220 may transmit, to the resonance power transmitter 100, the resonance frequency having the highest power transmission efficiency among the resonance frequencies used respectively in the time intervals. Accordingly, the target resonator 210 may receive, from the resonance power transmitter 100, a resonance power generated using the resonance frequency having the highest power transmission efficiency.

The target controller 230 may include a received power scanning unit 231, and a processor 233. The received power scanning unit 231 may measure a power amount of a resonance power received in one or more of the time intervals. The processor 233 may be configured to manage and/or control functions of the target controller 230.

The rectifier 240 may generate a DC voltage by rectifying an AC voltage.

The DC/DC converter 250 may adjust a level of the DC voltage output from the rectifier 240, and may provide a DC voltage required by the load 260.

The load 260 may include a charge battery to supply a power required by the resonance power receiver 200 and to charge the resonance power receiver 200. The target controller 230 may monitor the load 260, and may notify the resonance power transmitter 100 of a completion of charging of the resonance power receiver 200 when the charging of the resonance power receiver 200 is completed.

Figure 3:
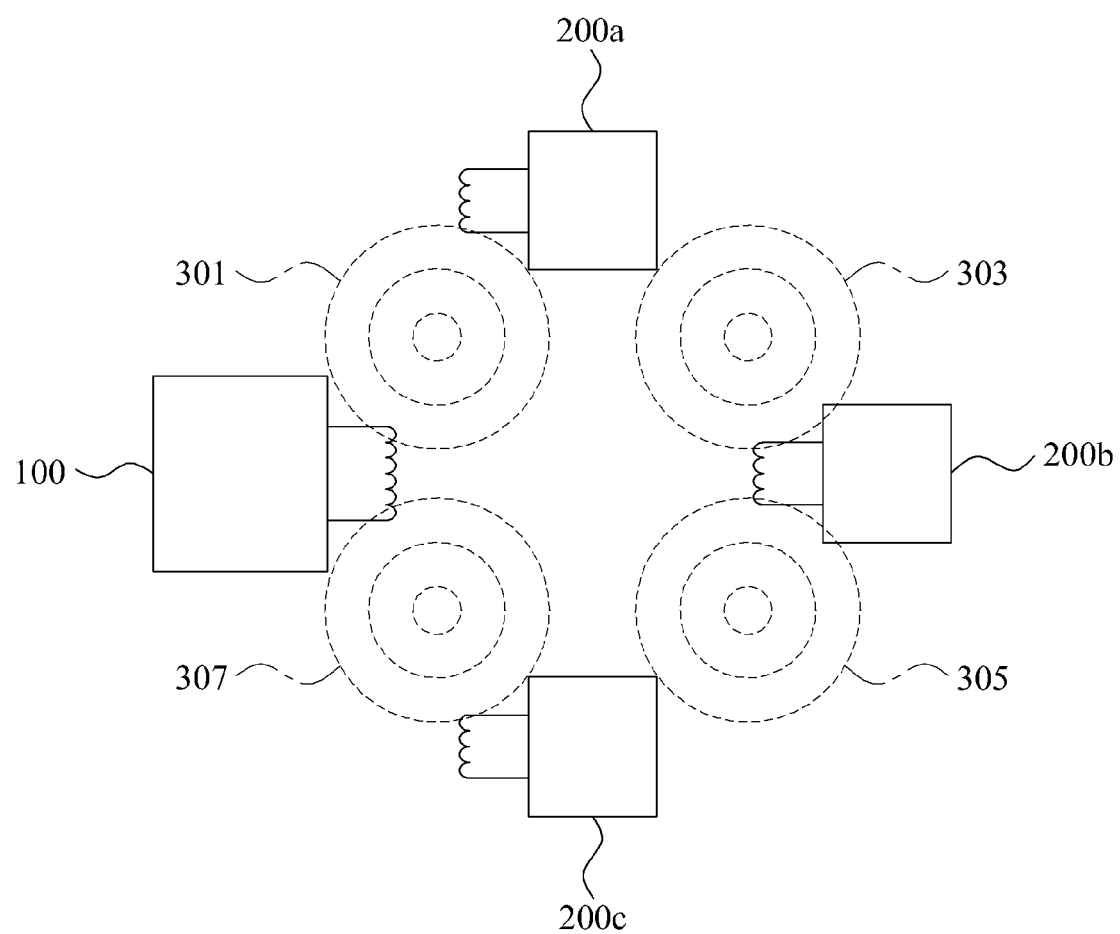
FIG. 3 is a diagram illustrating an environment in which a plurality of resonance power receivers exist.

FIG. 3 illustrates an environment in which a plurality of resonance power receivers exist.

As illustrated in FIG. 3, the resonance power transmitter 100 may transmit a resonance power to a plurality of resonance power receivers 200a, 200b, and 200c. The environment where the resonance power receivers 200a, 200b, and 200c exist may be referred to as a "1-to-N charging environment". In the 1-to-N charging environment, power transmission efficiency may be reduced when the resonance power receivers 200a, 200b, and 200c interfere with each other, when one of the resonance power receivers 200a, 200b, and 200c is removed, and/or when a new device is added. Accordingly, there is provided a method of controlling resonance power transmission based on each of the resonance power receivers 200a, 200b, and 200c. Reference numerals 301, 303, 305, and 307 of FIG. 3 represent magnetic coupling between adjacent resonators.

Figure 4:
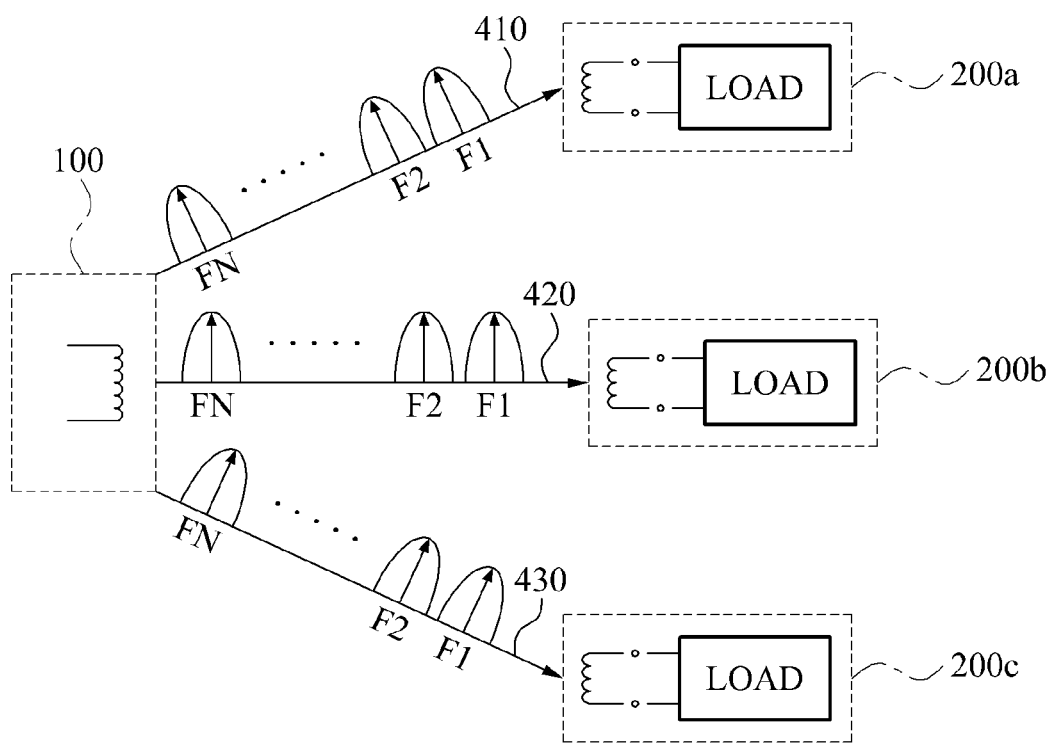
FIG. 4 is a diagram illustrating a resonance power transmission system.

FIG. 4 illustrates a resonance power transmission system.

Referring to FIG. 4, the resonance power transmitter 100 may transmit, to the resonance power receivers 200a, 200b, and 200c, a resonance power with resonance frequencies F1, F2, ..., and FN that are sequentially variable.

The resonance power transmitter 100 may determine an order of the resonance power receivers 200a, 200b, and 200c, and may transmit, to the resonance power receiver 200a, a resonance power with resonance frequencies F1, F2, ..., and FN that are sequentially variable in operation 410. After receiving a first response from the resonance power receiver 200a, the resonance power transmitter 100 may transmit, to the resonance power receiver 200b, a resonance power with resonance frequencies F1, F2, ..., and FN that are sequentially variable in operation 420. The first response may include information on a resonance frequency having a highest power transmission efficiency among the resonance frequencies F1, F2, ..., and FN. Additionally, the first response may further include an ID of the resonance power receiver 200a.

After receiving a second response from the resonance power receiver 200b, the resonance power transmitter 100 may transmit, to the resonance power receiver 200c, a resonance power with resonance frequencies F1, F2, ..., and FN that are sequentially variable in operation 430. The second response may include information on a resonance frequency having a highest power transmission efficiency among the resonance frequencies F1, F2, ..., and FN. Additionally, the second response may further include an ID of the resonance power receiver 200b.

In FIG. 4, it may assumed that, the resonance frequency having the highest power transmission efficiency for the resonance power receiver 200a is denoted by "Fs1", and that the resonance frequency having the highest power transmission efficiency for the resonance power receiver 200b is denoted by "Fs2." The resonance frequencies Fs1 and Fs2 may be different from, or identical to each other. Operations 410 through 430 of FIG. 4 may be performed sequentially or simultaneously, in some instances. In a situation where operations 410 through 430 are simultaneously performed, the resonance power transmitter 100 may identify the resonance power receivers 200a, 200b, and 200c, based on the IDs of the resonance power receivers 200a, 200b, and 200c.

Figure 5:
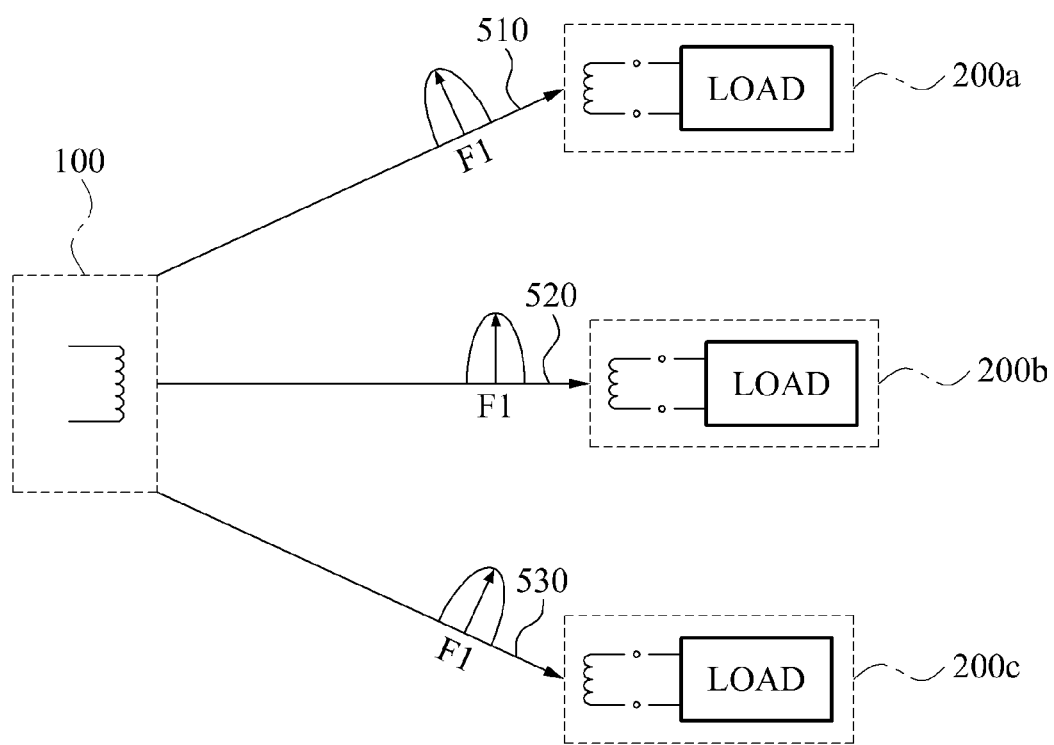
FIG. 5 is a diagram illustrating another resonance power transmission system.

FIG. 5 illustrates another resonance power transmission system.

Referring to FIG. 5, the resonance power transmitter 100 may transmit a resonance power with a resonance frequency F1 to a resonance power receiver 200a in operation 510. Similarly to the transmitter of FIG. 4, the resonance power transmitter 100 may receive a response signal from the resonance power receiver 200a, and may transmit another resonance power with the resonance frequency F1 to a resonance power receiver 200b in operation 520. Similarly, the resonance power transmitter 100 may receive a response signal from the resonance power receiver 200b and may transmit another resonance power with the resonance frequency F1 to a resonance power receiver 200c in operation 530. One or more of the response signals may include information regarding the efficiency of receiving a resonance power with a resonance frequency F1 or an amount of resonance power received in the resonance frequency F1. Additionally, one or more of the response signals may further include an ID of a corresponding resonance power receiver. When responding to the resonance frequency F1 is completed, the resonance power transmitter 100 may perform operations 510 through 530 with respect to a resonance frequency F2.

Figure 6:
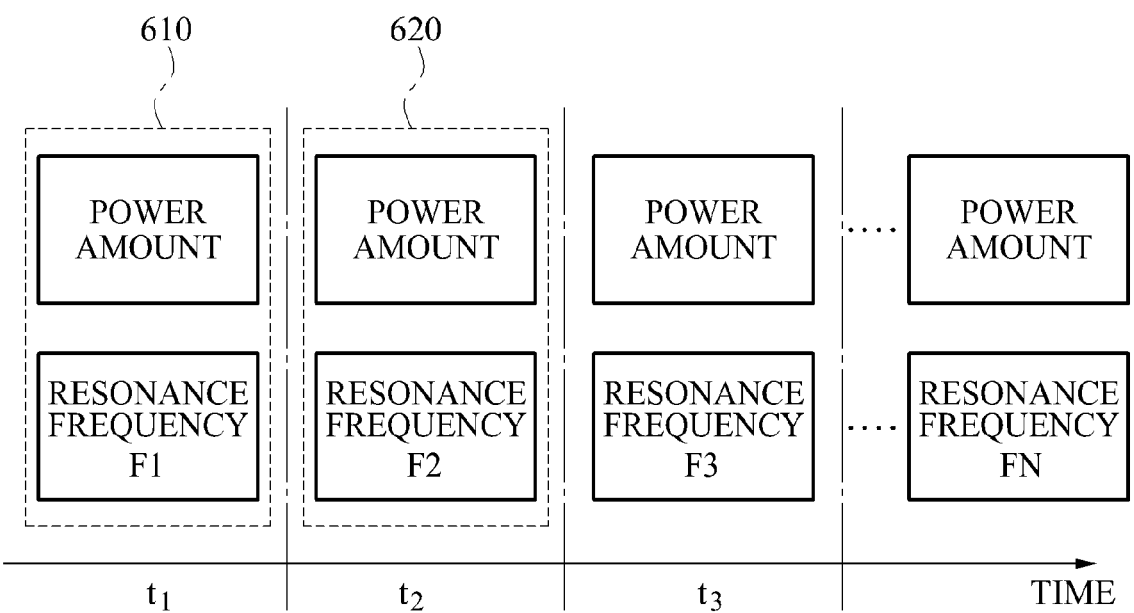
FIG. 6 is a diagram illustrating data transmitted from the resonance power transmitter of FIG. 1.

FIG. 6 illustrates data transmitted from the resonance power transmitter 100 of FIG. 1.

Referring to FIG. 6, the resonance power transmitter 100 may simultaneously transmit data 610 and a resonance power with a resonance frequency F1 to the resonance power receiver 200 of FIG. 2 in a time interval t1. The data 610 may include information on the resonance frequency F1 used to generate the resonance power, and/or information on a power amount of the resonance power, as illustrated in FIG. 6. Reference numeral 620 of FIG. 6 represents data transmitted to the resonance power receiver 200 in a time interval t2.

Figure 7:
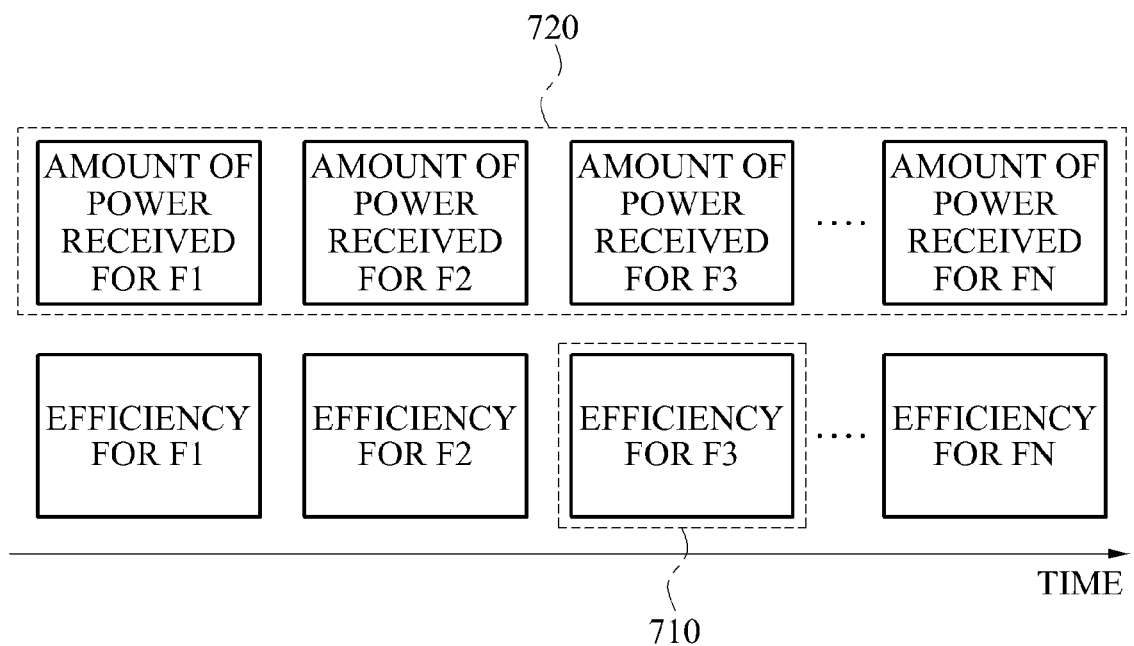
FIG. 7 is a diagram illustrating data transmitted from the resonance power receiver of FIG. 2.

FIG. 7 illustrates data transmitted from the resonance power receiver 200 of FIG. 2.

Referring to FIG. 7, the resonance power receiver 200 may detect data 720 regarding amounts of power received respectively corresponding to resonance frequencies F1, F2, ..., and FN, and may compute an efficiency corresponding to each of the resonance frequencies F1, F2, ..., and FN. In FIG. 7, data 710 for resonance frequency F3 may have a highest power transmission efficiency among the resonance frequencies F1, F2, ..., and FN. The resonance power receiver 200 may transmit, to the resonance power transmitter 100 of FIG. 1, the efficiency computed for each of the resonance frequencies F1, F2, ..., and FN, individually. Or the resonance power receiver 200 may transmit the data 720 to the resonance power transmitter 100, instead of computing the efficiency corresponding to each of the resonance frequencies F1, F2, ..., and FN.

Figure 8:
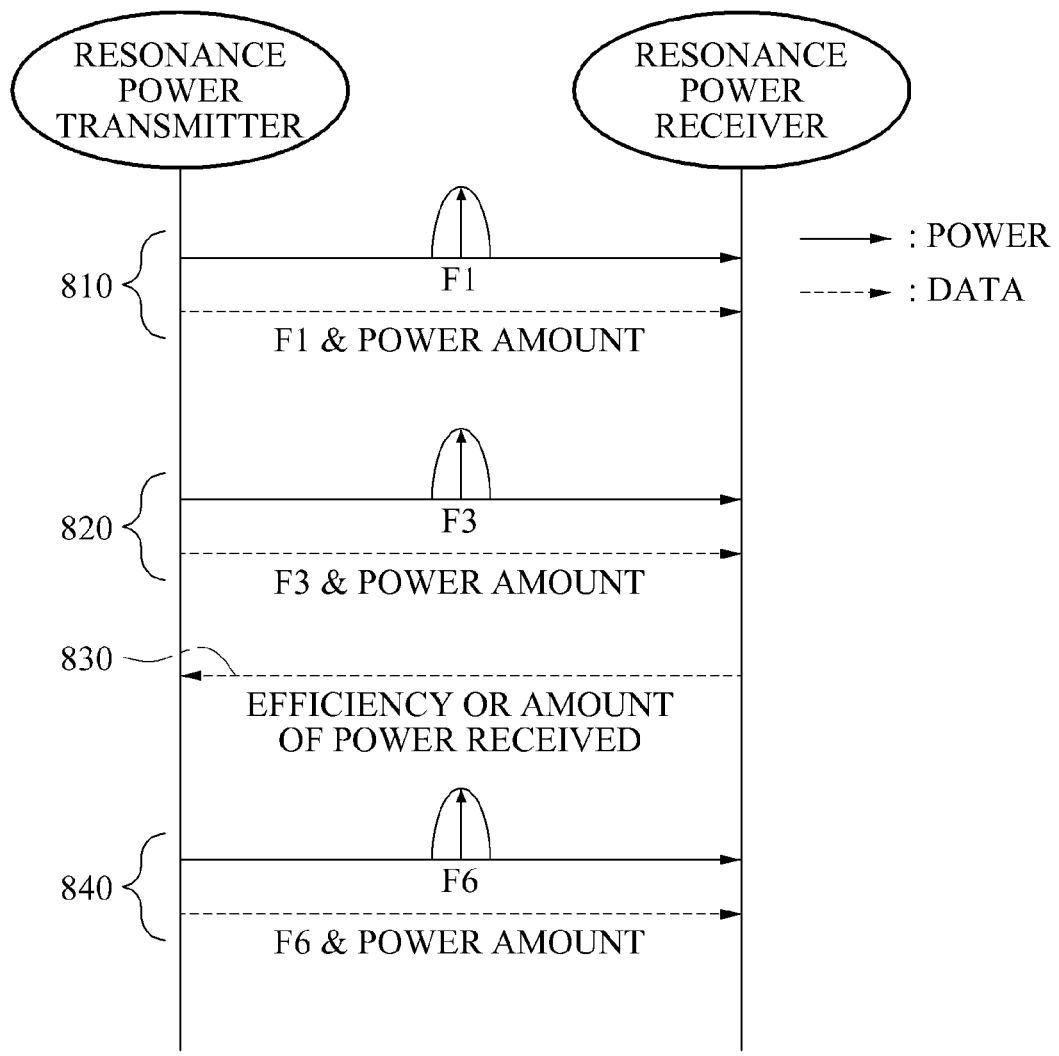
FIG. 8 is a diagram illustrating frequency hopping.

FIG. 8 illustrates frequency hopping.

In FIG. 8, resonance frequencies used to transmit resonance powers may be randomly hopped or skipped. For example, resonance frequencies F1, F3, and F6 may sequentially determine, instead of resonance frequencies F1, F2, ..., and FN being sequentially determined. In operation 810, a resonance power transmitter may transmit resonance power to a resonance power receiver using a resonance frequency F1. Additionally, in operation 810, the resonance power transmitter may transmit, to the resonance power receiver, information on the resonance frequency F1 and information on a power amount. Operation 820 may be performed with respect to a reference frequency F3, in a similar manner as operation 810. Additionally, operation 840 may be performed with respect to a reference frequency F6, in a similar manner as operation 810. In operation 830, the resonance power receiver may transmit, to the resonance power transmitter, information on a power transmission efficiency or information on an amount of power received.

Figure 10:
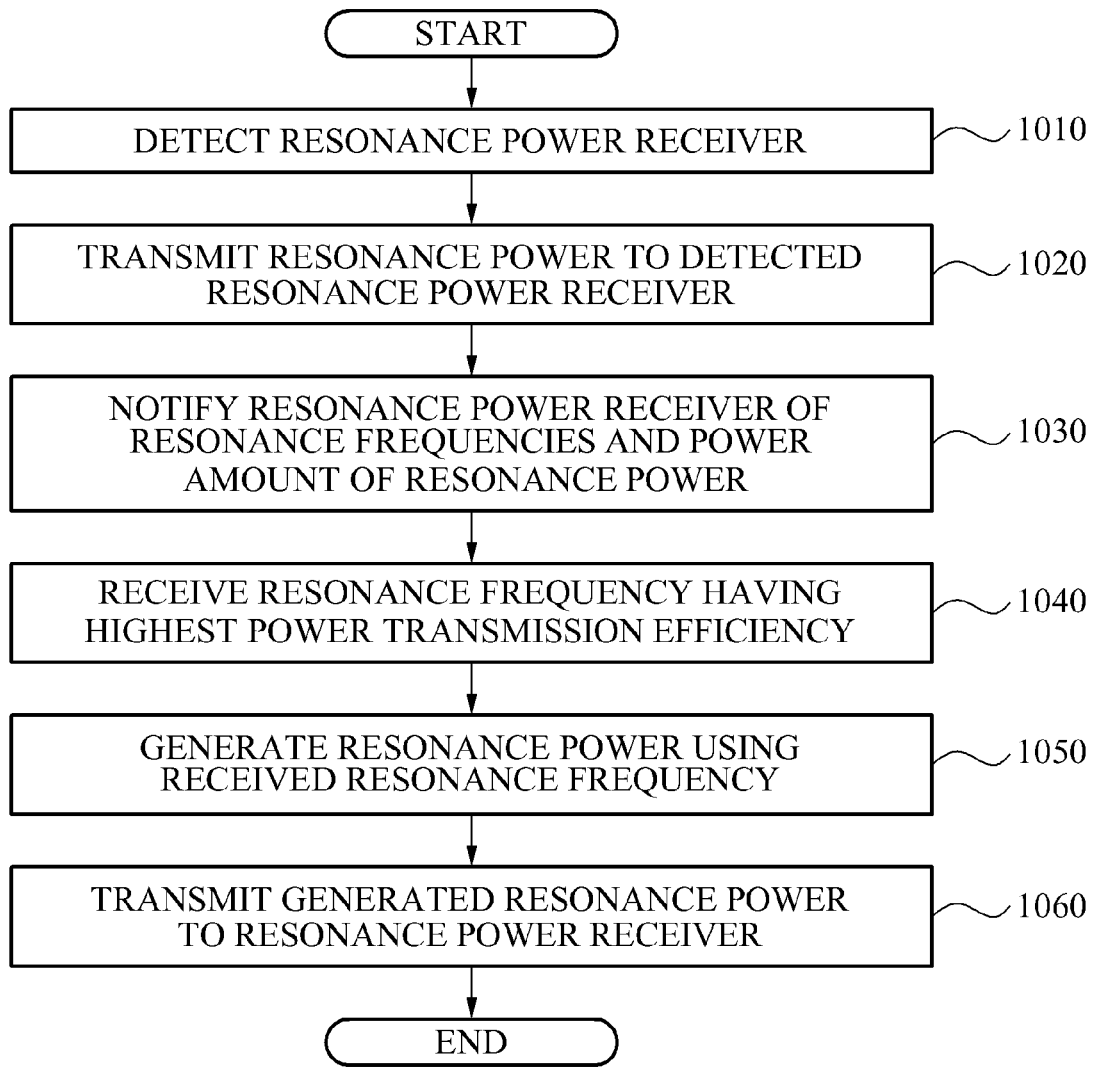
FIG. 10 is a diagram illustrating a method of controlling resonance power transmission in a resonance power transmitter.

FIG. 10 illustrates a method of controlling resonance power transmission in a resonance power transmitter. In one or more embodiments, the method of FIG. 10 may be performed by the resonance power transmitter 100 of FIG. 1.

In operation 1010, the resonance power transmitter 100 may detect a resonance power receiver. For example, the resonance power transmitter 100 may determine whether a resonance power receiver exists within a coverage that enables the resonance power transmission. The resonance power transmitter 100 may receive an ID of the resonance power receiver, and may recognize the resonance power receiver based on the received ID.

In operation 1020, the resonance power transmitter 100 may transmit resonance power to the detected resonance power receiver. The resonance frequency of the resonance power transmitted in operation 1020 may vary for one or more of time intervals. One or more of the resonance frequencies used in the time intervals may be determined by scanning a frequency characteristic of a reflected wave, or may be determined based on a channel of a predetermined width, or may be randomly determined in a predetermined bandwidth.

In operation 1030, the resonance power transmitter 100 may notify the detected resonance power receiver of the resonance frequencies used respectively in the time intervals, and of a power amount of the resonance power transmitted in each of the time intervals. The detected resonance power receiver may detect a resonance frequency having the highest power transmission efficiency among the resonance frequencies used respectively in the time intervals, and may notify the resonance power transmitter 100 of the detected resonance frequency.

In operation 1040, the resonance power transmitter 100 may receive the detected resonance frequency from the detected resonance power receiver.

In operation 1050, the resonance power transmitter 100 may generate the resonance power using the resonance frequency received in operation 1040.

In operation 1060, the resonance power transmitter 100 may transmit the resonance power generated in operation 1050 to the resonance power receiver.

Figure 11:
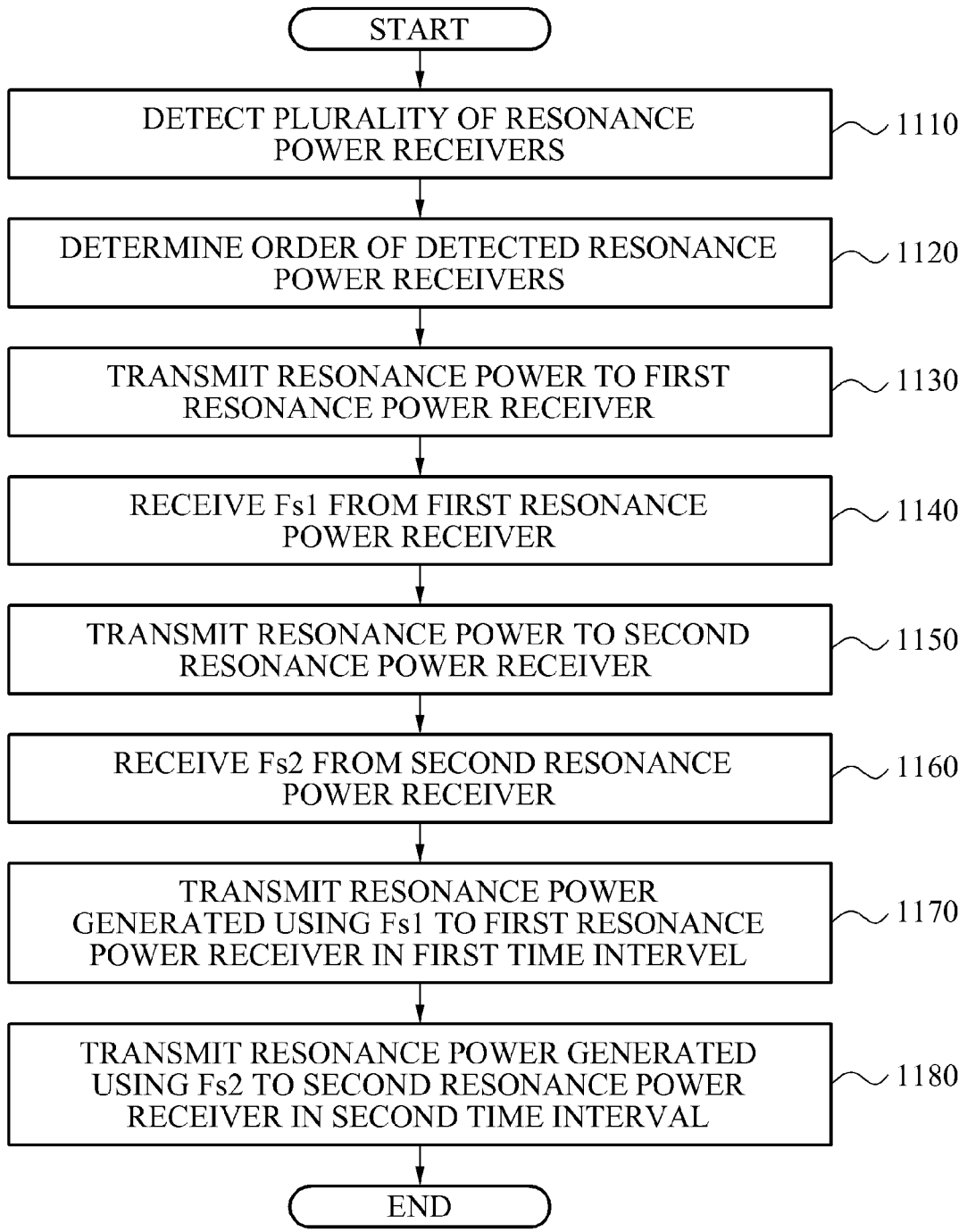
FIG. 11 is a diagram illustrating another method of controlling resonance power transmission in a resonance power transmitter.

FIG. 11 illustrates another method of controlling resonance power transmission in a resonance power transmitter.

In one or more embodiments, the method of FIG. 11 may be performed using the resonance power transmitter 100 of FIG. 1.

In operation 1110, the resonance power transmitter 100 may detect a plurality of resonance power receivers. For example, the resonance power transmitter 100 may receive IDs of the plurality of resonance power receivers, and may recognize the plurality of resonance power receiver based on the received IDs. Accordingly, the resonance power transmitter 100 may verify a number of resonance power receivers based on a number of the received IDs.

In operation 1120, the resonance power transmitter 100 may determine an order of the plurality of resonance power receivers detected in operation 1110. This may be the sequential order in which they were detected, in some instances. Alternatively, some predetermined or default ordering system might be employed.

In operation 1130, the resonance power transmitter 100 may transmit resonance power to a first resonance power receiver based on the determined order. The resonance frequency of the resonance power transmitted in operation 1130 may vary for each of time intervals.

In operation 1140, the resonance power transmitter 100 may receive, from the first resonance power receiver, a resonance frequency Fs1 having a highest power transmission efficiency for the first resonance power receiver among resonance frequencies used respectively in the time intervals.

In operation 1150, the resonance power transmitter 100 may transmit resonance power to a second resonance power receiver based on the determined order. The resonance frequency of the resonance power transmitted in operation 1150 may vary for each of the time intervals.

In operation 1160, the resonance power transmitter 100 may receive, from the second resonance power receiver, a resonance frequency Fs2 having a highest power transmission efficiency for the second resonance power receiver among the resonance frequencies used respectively in the time intervals.

In operation 1170, the resonance power transmitter 100 may generate the resonance power using the resonance frequency Fs1, and may transmit the resonance power generated using the resonance frequency Fs1 to the first resonance power receiver in a first time interval.

In operation 1180, the resonance power transmitter 100 may generate the resonance power using the resonance frequency Fs2, and may transmit the resonance power generated using the resonance frequency Fs2 to the second resonance power receiver in a second time interval.

Figure 12:
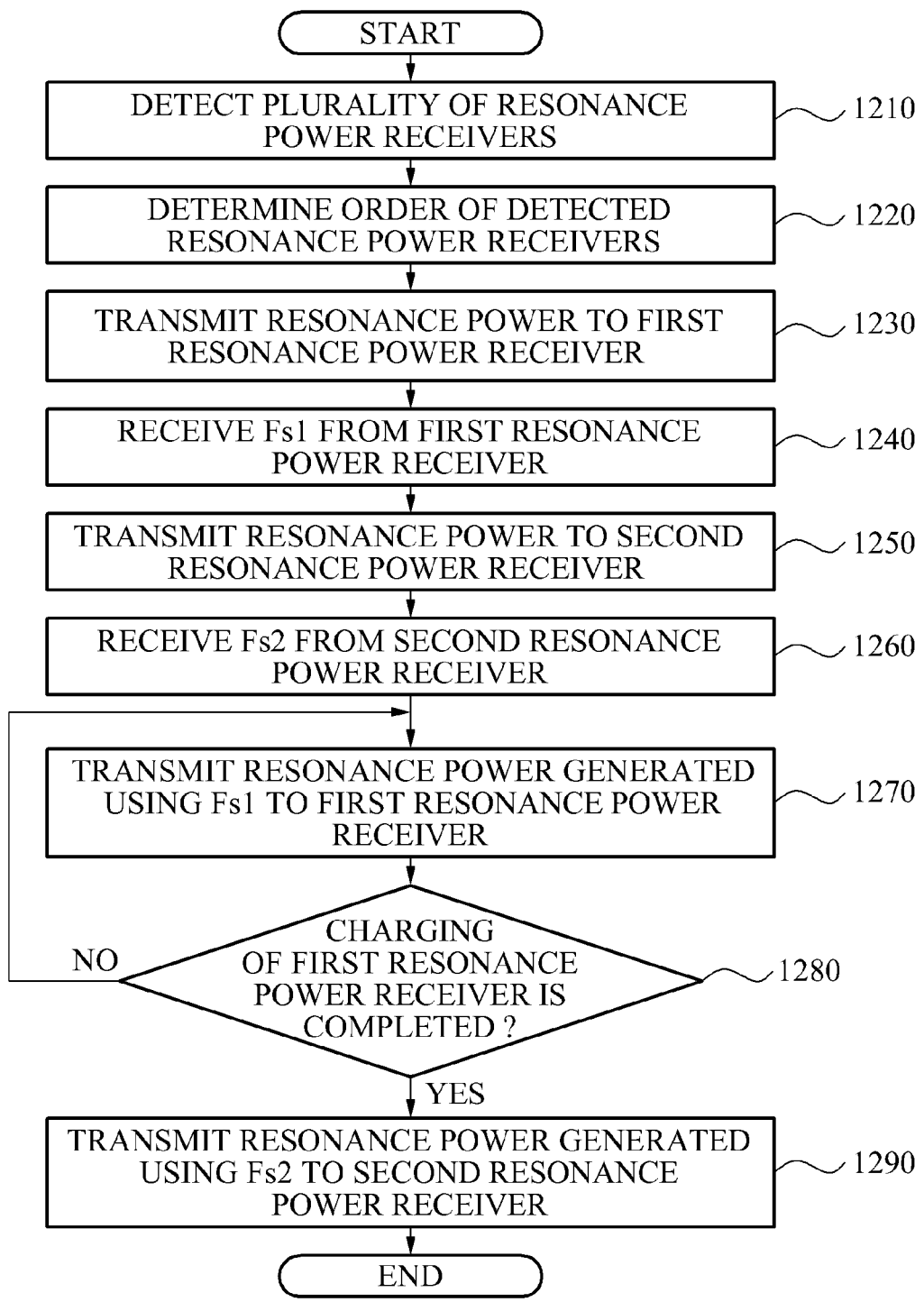
FIG. 12 is a diagram illustrating still another method of controlling resonance power transmission in a resonance power transmitter.

FIG. 12 illustrates still another method of controlling resonance power transmission in a resonance power transmitter.

In some instances, operations 1210 through 1260 of FIG. 12 may be similar to operations 1110 through 1160 of FIG. 11 and accordingly, further descriptions of operation 1210 through 1260 will be omitted.

In operation 1270, the resonance power transmitter 100 may generate the resonance power using the resonance frequency Fs1, and may transmit the resonance power generated using the resonance frequency Fs1 to the first resonance power receiver.

In operation 1280, the resonance power transmitter 100 may determine whether charging of the first resonance power receiver is completed. For example, whether the charging of the first resonance power receiver is completed may be determined based on whether a message indicating a completion of the charging is received from the first resonance power receiver.

If charging of the first resonance power receiver is not completed, the method returns to operation 1270. And, when the charging of the first resonance power receiver is completed, the resonance power transmitter 100 may generate the resonance power using the resonance frequency Fs2, and may transmit the resonance power generated using the resonance frequency Fs2 to the second resonance power receiver in operation 1290.

Figure 13:
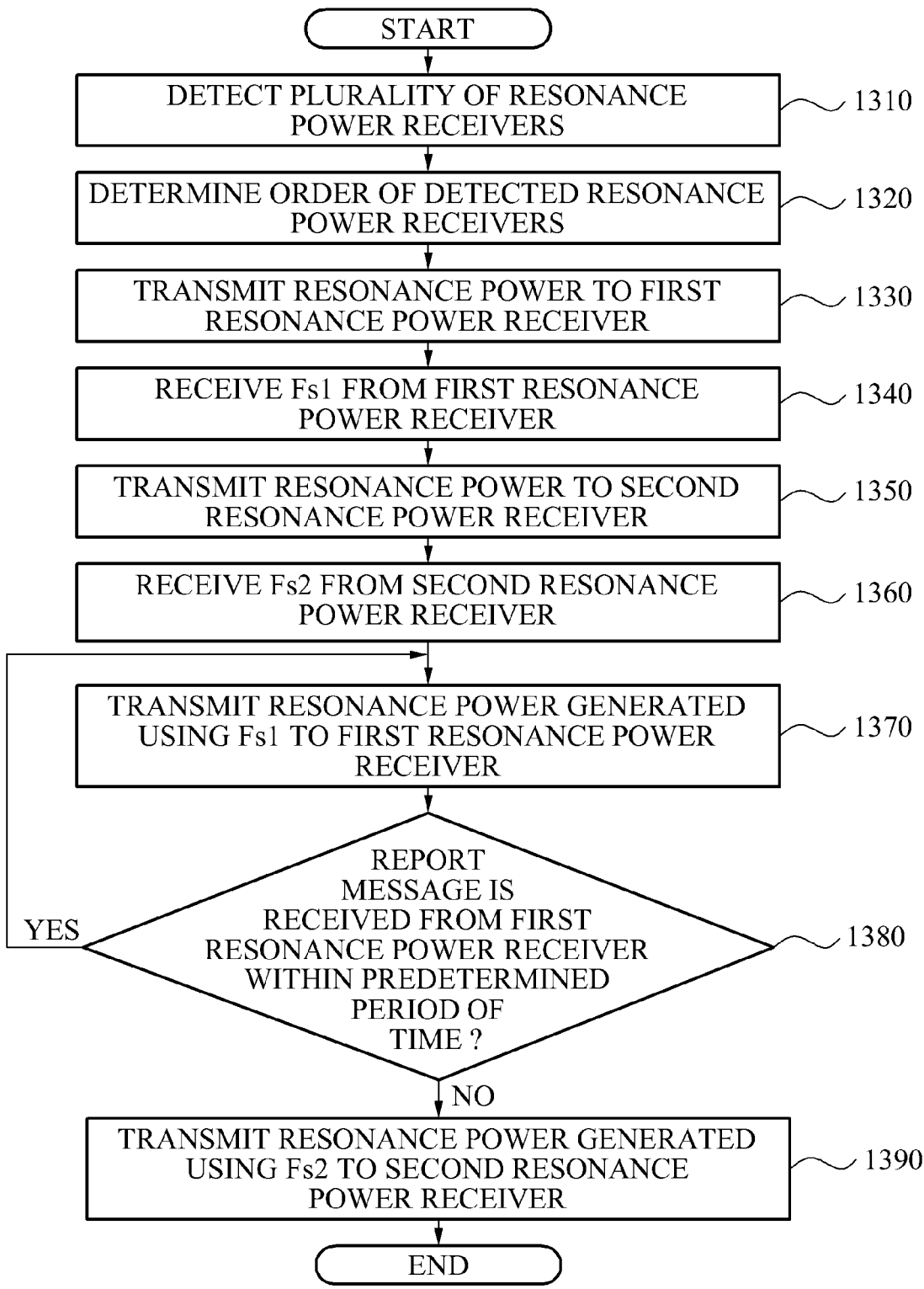
FIG. 13 is a diagram illustrating yet another method of controlling resonance power transmission in a resonance power transmitter.

FIG. 13 illustrates yet another method of controlling resonance power transmission in a resonance power transmitter.

In some instance, operations 1310 through 1360 of FIG. 13 may be similar to operations 1110 through 1160 of FIG. 11 and accordingly, further descriptions of operation 1310 through 1360 will be omitted.

In operation 1370, the resonance power transmitter 100 may generate the resonance power using the resonance frequency Fs1, and may transmit the resonance power generated using the resonance frequency Fs1 to the first resonance power receiver.

In operation 1380, the resonance power transmitter 100 may determine whether a report message is received from the first resonance power receiver within a predetermined period of time. The first resonance power receiver may notify the resonance power transmitter 100 that the first resonance power receiver continues to be charged by periodically transmitting report messages to the resonance power transmitter 100. Accordingly, when a report message is not received from the first resonance power receiver within the predetermined period of time, the resonance power transmitter 100 may determine or assume that the first resonance power receiver does not exist. The report message may include an ID of the first resonance power receiver, for instance.

If the report message is received from the first resonance power receiver within the predetermined period of time, the method returns to operation 1370. And when the report message is not received from the first resonance power receiver within the predetermined period of time, the resonance power transmitter 100 may terminate transmitting the resonance power to the first resonance power receiver. Additionally, the resonance power transmitter 100 may generate the resonance power using the resonance frequency Fs2, and may transmit the resonance power generated using the resonance frequency Fs2 to the second resonance power receiver in operation 1390.

Figure 14:
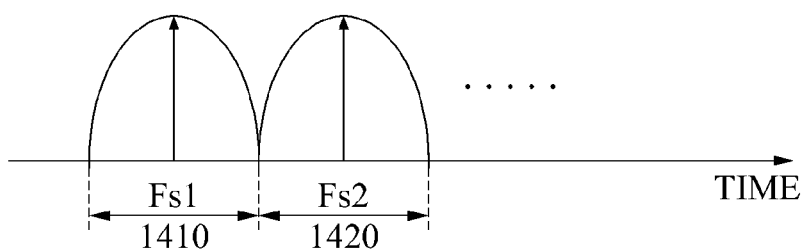
FIGS. 14 and 15 are diagrams illustrating power transmission in a time domain.
Figure 15:
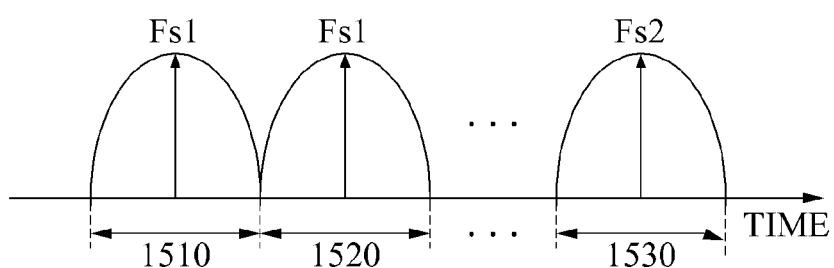

FIGS. 14 and 15 illustrate resonance power transmission, after resonance frequencies Fs1 and Fs2 are received from resonance power receivers 200*a* and 200*b*.

In FIG. 14, the resonance power transmitter 100 may transmit a resonance power to the resonance power receiver 200*a* using the resonance frequency Fs1 in a first time interval 1410, and may transmit a resonance power to the resonance power receiver 200*b* using the resonance frequency Fs2 in a second time interval 1420. The resonance power transmitter 100 may generate the resonance power by alternately using the resonance frequencies Fs1 and Fs2.

In FIG. 15, the resonance power transmitter 100 may transmit resonance power to the resonance power receiver 200*a* using the resonance frequency Fs1 in a third time interval 1510 and a fourth time interval 1520. Thus, for consecutive time intervals, the resonance frequency Fs1 having a highest power transmission efficiency for the resonance power receiver 200*a* may be used, as illustrated in FIG. 15.

According to various example embodiments, it may be possible to efficiently manage resonance frequencies in a resonance frequency band.

Additionally, it may be possible to efficiently charge a plurality of electronic devices with a resonance power, by managing resonance frequencies respectively corresponding to the plurality of electronic devices. Furthermore, high-efficiency wireless power transmission may be performed by selecting a resonance frequency with high power transmission efficiency.

Referring again to FIGS. 1 and 2, the source resonator 110 and/or the target resonator 210 may be configured, for example, as a helix coil structured resonator, a spiral coil structured resonator, a meta-structured resonator, and/or the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a predetermined magnetic field in a corresponding material and a magnetic flux density occurring with respect to the predetermined magnetic field in a vacuum state. The permittivity indicates a ratio between an electric flux density occurring with respect to a given electric field in a corresponding material and an electric flux density occurring with respect to the given electric field in a vacuum state. The magnetic permeability and the permittivity, in some embodiments, may be used to determine a propagation constant of a corresponding material in a predetermined frequency or a predetermined wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area.

Figure 16:
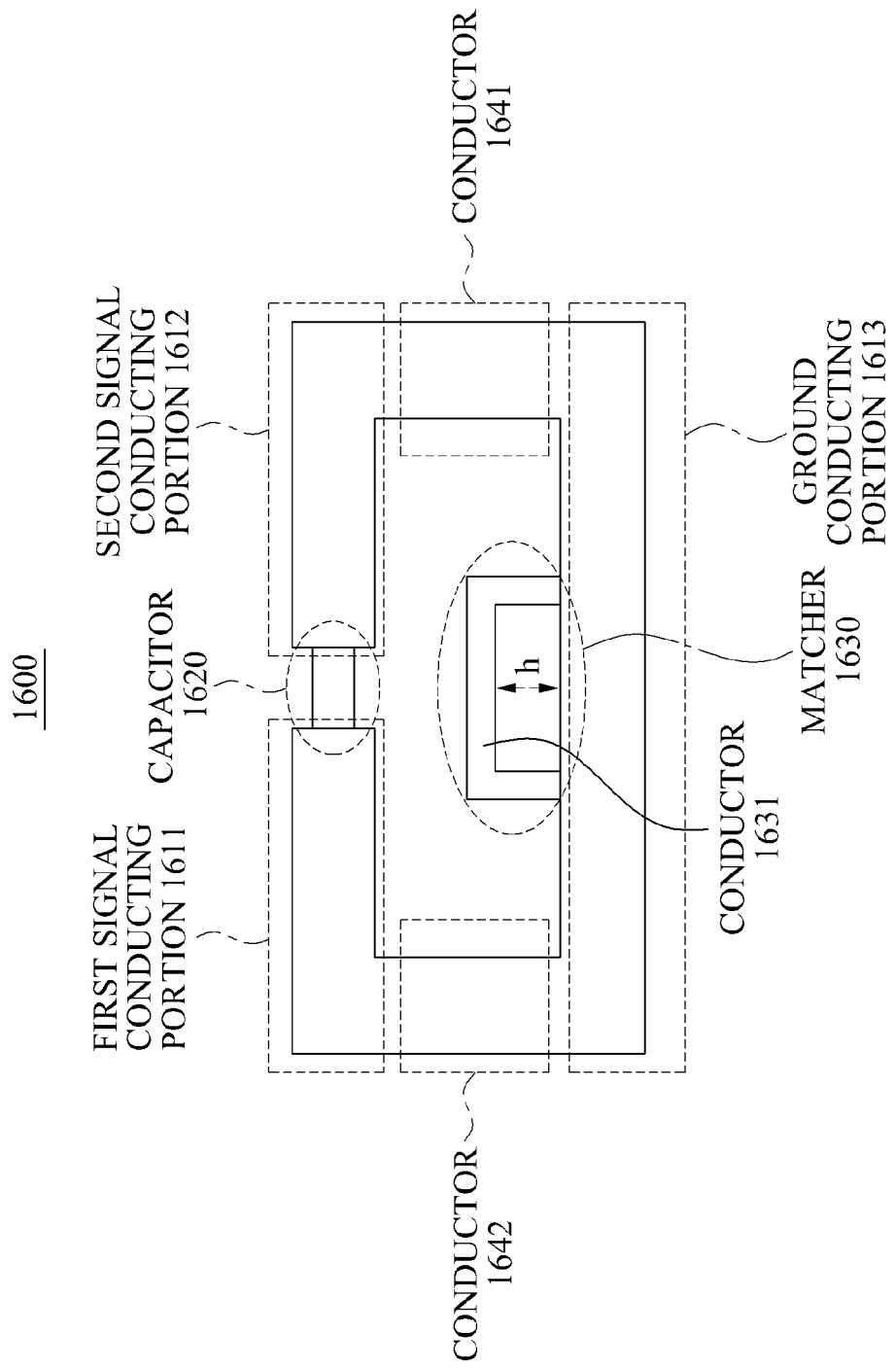
FIGS. 16 through 22B are diagrams illustrating various resonator structures.

FIG. 16 is an illustration of a two-dimensional (2D) resonator 1600.

As shown, the resonator 1600 having the 2D structure may include a transmission line, a capacitor 1620, a matcher 1630, and conductors 1641 and 1642. The transmission line may include, for instance, a first signal conducting portion 1611, a second signal conducting portion 1612, and a ground conducting portion 1613.

The capacitor 1620 may be inserted or otherwise positioned in series between the first signal conducting portion 1611 and the second signal conducting portion 1612 so that an electric field may be confined within the capacitor 1620, as illustrated in FIG. 16. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As illustrated in FIG. 16, the resonator 1600 may be configured to have a generally 2D structure. The transmission line may include the first signal conducting portion 1611 and the second signal conducting portion 1612 in the upper portion of the transmission line, and may include the ground conducting portion 1613 in the lower portion of the transmission line. As shown, the first signal conducting portion 1611 and the second signal conducting portion 1612 may be disposed to face the ground conducting portion 1613 with current flowing through the first signal conducting portion 1611 and the second signal conducting portion 1612.

In some implementations, one end of the first signal conducting portion 1611 may be electrically connected (i.e., shorted) to the conductor 1642, and another end of the first signal conducting portion 1611 may be connected to the capacitor 1620. And one end of the second signal conducting portion 1612 may be grounded to the conductor 1641, and another end of the second signal conducting portion 1612 may be connected to the capacitor 1620. Accordingly, the first signal conducting portion 1611, the second signal conducting portion 1612, the ground conducting portion 1613, and the conductors 1641 and 1642 may be connected to each other such that the resonator 1600 may have an electrically "closed-loop structure." The term "closed-loop structure" as used herein, may include a polygonal structure, for example, a circular structure, a rectangular structure, or the like that is a circuit that is electrically closed.

The capacitor 1620 may be inserted into an intermediate portion of the transmission line. For example, the capacitor 1620 may be inserted into a space between the first signal conducting portion 1611 and the second signal conducting portion 1612. The capacitor 1620 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

If the capacitor 1620 is inserted into the transmission line, the resonator 1600 may have a property of a metamaterial, as discussed above. For example, the resonator 1600 may have a negative magnetic permeability due to the capacitance of the capacitor 1620. If so, the resonator 1600 may also be referred to as a mu negative (MNG) resonator. Various criteria may be applied to determine the capacitance of the capacitor 1620. For example, the various criteria for enabling the resonator 1600 to have the characteristic of the metamaterial may include one or more of the following: a criterion to enable the resonator 1600 to have a negative magnetic permeability in a target frequency, a criterion to enable the resonator 1600 to have a zeroth order resonance characteristic in the target frequency, or the like. The resonator 1600, also referred to as the MNG resonator 1600, may also have a zeroth order resonance characteristic (i.e., having, as a resonance frequency, a frequency when a propagation constant is "0"). If the resonator 1600 has the zeroth order resonance characteristic, the resonance frequency may be independent with respect to a physical size of the MNG resonator 1600. Moreover, by appropriately designing the capacitor 1620, the MNG resonator 1600 may sufficiently change the resonance frequency without significantly changing the physical size of the MNG resonator 1600.

In a near field, for instance, the electric field may be concentrated on the capacitor 1620 inserted into the transmission line. Accordingly, due to the capacitor 1620, the magnetic field may become dominant in the near field. In one or more embodiments, the MNG resonator 1600 may have a relatively high Q-factor using the capacitor 1620 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 1600 may include a matcher 1630 to be used in impedance matching. For example, the matcher 1630 may be configured to appropriately determine and adjust the strength of a magnetic field of the MNG resonator 1600. Depending on the configuration, current may flow in the MNG resonator 1600 via a connector, or may flow out from the MNG resonator 1600 via the connector. The connector may be connected to the ground conducting portion 1613 or the matcher 1630. In some instances, the power may be transferred through coupling without using a physical connection between the connector and the ground conducting portion 1613 or the matcher 1630.

As illustrated in FIG. 16, the matcher 1630 may be positioned within the loop formed by the loop structure of the resonator 1600. The matcher 1630 may adjust the impedance of the resonator 1600 by changing the physical shape of the matcher 1630. For example, the matcher 1630 may include the conductor 1631 to be used in the impedance matching positioned in a location that is separate from the ground conducting portion 1613 by a distance h. The impedance of the resonator 1600 may be changed by adjusting the distance h.

In some instances, a controller may be provided that is configured to control the matcher 1630 which generates and transmits a control signal to the matcher 1630 directing the matcher to change its physical shape so that the impedance of the resonator may be adjusted. For example, the distance h between the conductor 1631 of the matcher 1630 and the ground conducting portion 1613 may be increased or decreased based on the control signal. The controller may generate the control signal based on various factors.

As illustrated in FIG. 16, the matcher 1630 may be configured as a passive element such as the conductor 1631, for example. Of course, in others embodiments, the matcher 1630 may be configured as an active element such as a diode, a transistor, or the like. If the active element is included in the matcher 1630, the active element may be driven based on the control signal generated by the controller, and the impedance of the resonator 1600 may be adjusted based on the control signal. For example, when the active element is a diode included in the matcher 1630, the impedance of the resonator 1600 may be adjusted depending on whether the diode is in an on state or in an off state.

In some instances, a magnetic core may be further provided to pass through the MNG resonator 1600. The magnetic core may perform a function of increasing a power transmission distance.

Figure 17:
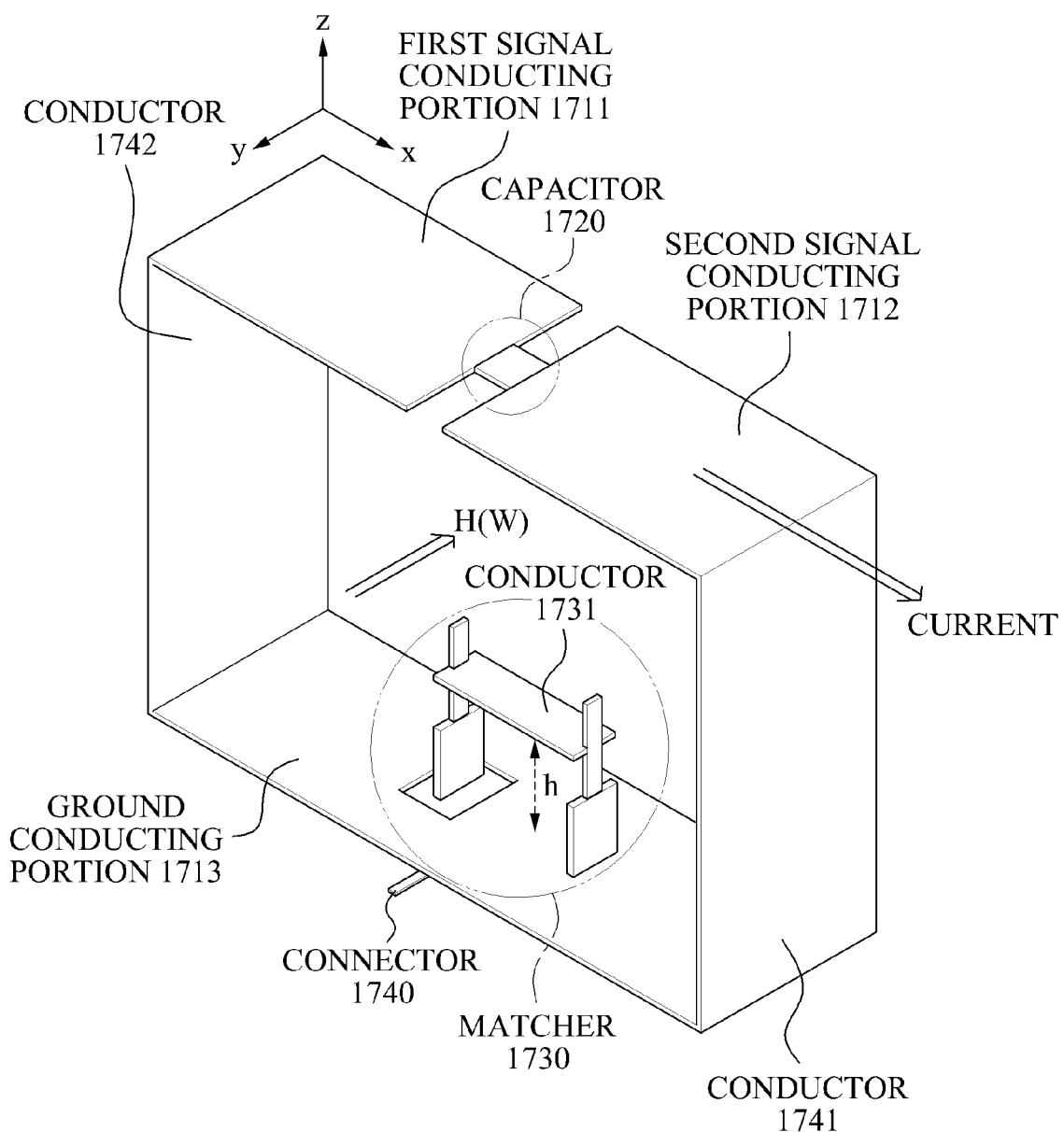

FIG. 17 is an illustration of a resonator 1700 having a three-dimensional (3D) structure.

Referring to FIG. 17, the resonator 1700 having the 3D structure may include a transmission line and a capacitor 1720. The transmission line may include a first signal conducting portion 1711, a second signal conducting portion 1712, and a ground conducting to portion 1713. The capacitor 1720 may be inserted, for instance, in series between the first signal conducting portion 1711 and the second signal conducting portion 1712 of the transmission link such that an electric field may be confined within the capacitor 1720.

As illustrated in FIG. 17, the resonator 1700 may have a generally 3D structure. The transmission line may include the first signal conducting portion 1711 and the second signal conducting portion 1712 in an upper portion of the resonator 1700, and may include the ground conducting portion 1713 in a lower portion of the resonator 1700. The first signal conducting portion 1711 and the second signal conducting portion 1712 may be disposed to face the ground conducting portion 1713. In this arrangement, current may flow in an x direction through the first signal conducting portion 1711 and the second signal conducting portion 1712. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 1711 may be electrically connected (i.e., shorted) to the conductor 1742, and another end of the first signal conducting portion 1711 may be connected to the capacitor 1720. One end of the second signal conducting portion 1712 may be grounded to the conductor 1741, and another end of the second signal conducting portion 1712 may be connected to the capacitor 1720. Accordingly, the first signal conducting portion 1711, the second signal conducting portion 1712, the ground conducting portion 1713, and the conductors 1741 and 1742 may be connected to each other, whereby the resonator 1700 may have an electrically closed-loop structure. As illustrated in FIG. 17, the capacitor 1720 may be inserted or otherwise positioned between the first signal conducting portion 1711 and the second signal conducting portion 1712. For example, the capacitor 1720 may be inserted into a space between the first signal conducting portion 1711 and the second signal conducting portion 1712. The capacitor 1720 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 1720 is inserted into the transmission line, the resonator 1700 may have a property of a metamaterial, in some instances, as discussed above.

For example, when a capacitance of the capacitor is a lumped element, the resonator 1700 may have the characteristic of the metamaterial. When the resonator 1700 has a negative magnetic permeability by appropriately adjusting the capacitance of the capacitor 1720, the resonator 1700 may also be referred to as an MNG resonator. Various criteria may be applied to determine the capacitance of the capacitor 1720. For example, the various criteria may include one or more of the following: a criterion to enable the resonator 1700 to have the characteristic of the metamaterial, a criterion to enable the resonator 1700 to have a negative magnetic permeability in a target frequency, a criterion to enable the resonator 1700 to have a zeroth order resonance characteristic in the target frequency, or the like. Based on at least one criterion among the aforementioned criteria, the capacitance of the capacitor 1720 may be determined.

The resonator 1700, also referred to as the MNG resonator 1700, may have a zeroth order resonance characteristic (i.e., having, as a resonance frequency, a frequency when a propagation constant is "0"). If the resonator 1700 has a zeroth order resonance characteristic, the resonance frequency may be independent with respect to a physical size of the MNG resonator 1700. Thus, by appropriately designing the capacitor 1720, the MNG resonator 1700 may sufficiently change the resonance frequency without significantly changing the physical size of the MNG resonator 1700.

Referring to the MNG resonator 1700 of FIG. 17, in a near field, the electric field may be concentrated on the capacitor 1720 inserted into the transmission line. Accordingly, due to the capacitor 1720, the magnetic field may become dominant in the near field. And, since the MNG resonator 1700 having the zeroth-order resonance characteristic may have characteristics similar to a magnetic dipole, the magnetic field may become dominant in the near field. A relatively small amount of the electric field formed due to the insertion of the capacitor 1720 may be concentrated on the capacitor 1720 and thus, the magnetic field may become further dominant.

Also, the MNG resonator 1700 may include the matcher 1730 to be used in impedance matching. The matcher 1730 may be configured to appropriately adjust the strength of magnetic field of the MNG resonator 1700. The impedance of the MNG resonator 1700 may be determined by the matcher 1730. In one or more embodiments, current may flow in the MNG resonator 1700 via a connector 1740, or may flow out from the MNG resonator 1700 via the connector 1740. And the connector 1740 may be connected to the ground conducting portion 1713 or the matcher 1730.

As illustrated in FIG. 17, the matcher 1730 may be positioned within the loop formed by the loop structure of the resonator 1700. The matcher 1730 may be configured to adjust the impedance of the resonator 1700 by changing the physical shape of the matcher 1730. For example, the matcher 1730 may include the conductor 1731 to be used in the impedance matching in a location separate from the ground conducting portion 1713 by a distance h. The impedance of the resonator 1700 may be changed by adjusting the distance h.

In some implementations, a controller may be provided to control the matcher 1730. In this case, the matcher 1730 may change the physical shape of the matcher 1730 based on a control signal generated by the controller. For example, the distance h between the conductor 1731 of the matcher 1730 and the ground conducting portion 1713 may be increased or decreased based on the control signal. Accordingly, the physical shape of the matcher 1730 may be changed such that the impedance of the resonator 1700 may be adjusted. The distance h between the conductor 1731 of the matcher 1730 and the ground conducting portion 1713 may be adjusted using a variety of schemes. For example, one or more conductors may be included in the matcher 1730 and the distance h may be adjusted by adaptively activating one of the conductors. Alternatively or additionally, the distance h may be adjusted by adjusting the physical location of the conductor 1731 up and down. For instance, the distance h may be controlled based on the control signal of the controller. The controller may generate the control signal using various factors. As illustrated in FIG. 17, the matcher 1730 may be configured as a passive element such as the conductor 1731, for instance. Of course, in other embodiments, the matcher 1730 may be configured as an active element such as a diode, a transistor, or the like. If the active element is included in the matcher 1730, the active element may be driven based on the control signal generated by the controller, and the impedance of the resonator 1700 may be adjusted based on the control signal. For example, if the active element is a diode included in the matcher 1730, the impedance of the resonator 1700 may be adjusted depending on whether the diode is in an ON state or in an OFF state.

In some implementations, a magnetic core may be further provided to pass through the resonator 1700 configured as the MNG resonator. The magnetic core may increase the power transmission distance.

Figure 18:
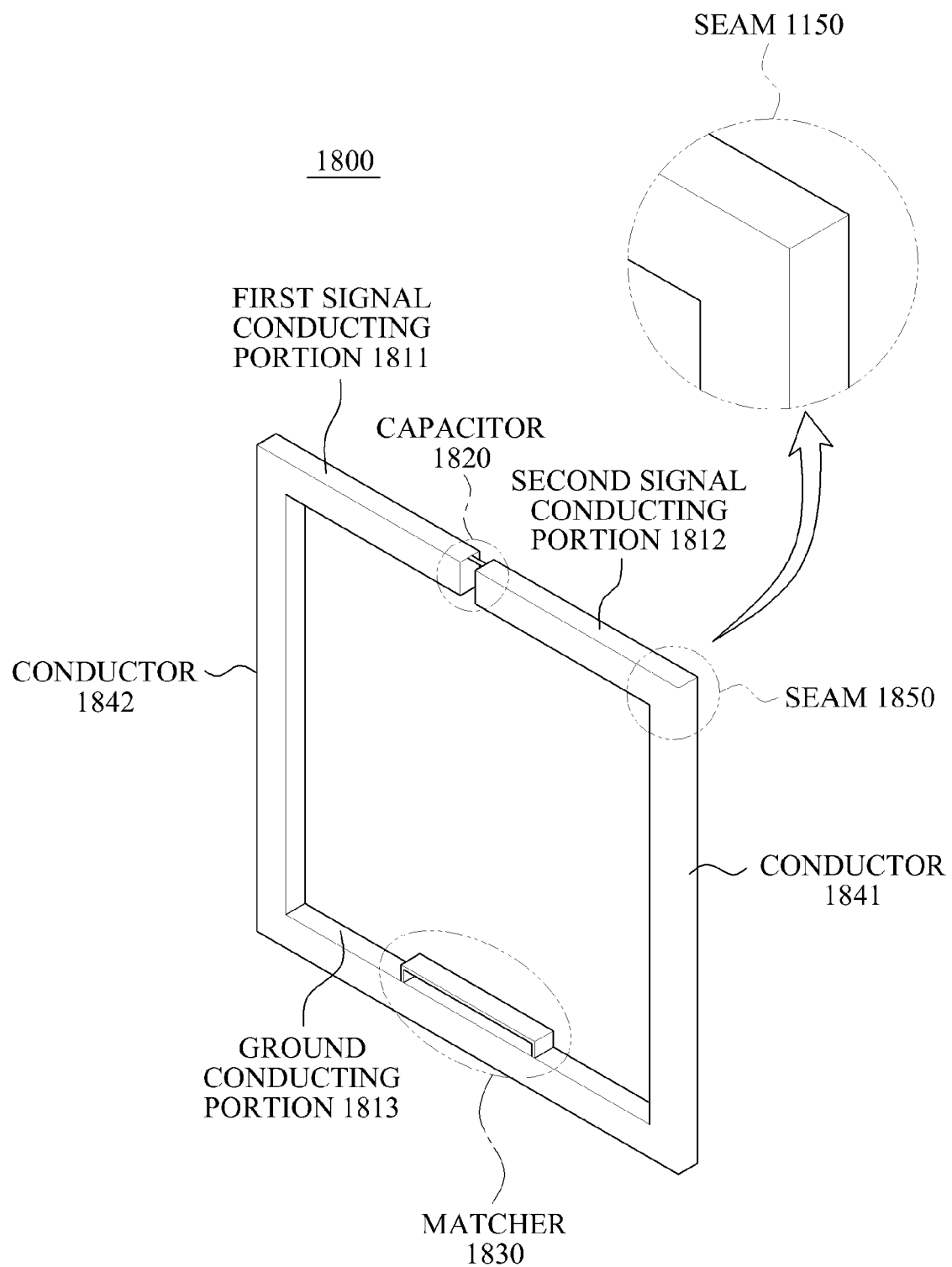

FIG. 18 illustrates a resonator 1800 for a wireless power transmission configured as a bulky type.

As used herein, the term "bulky type" may refer to a seamless connection connecting at least two parts in an integrated form.

Referring to FIG. 18, a first signal conducting portion 1811 and a conductor 1842 may be integrally formed, rather than being separately manufactured and being connected to each other. Similarly, a second signal conducting portion 1812 and a conductor 1841 may also be integrally manufactured.

When the second signal conducting portion 1812 and the conductor 1841 are separately manufactured and then are connected to each other, a loss of conduction may occur to due to a seam 1850. Thus, in some implementations, the second signal conducting portion 1812 and the conductor 1841 may be connected to each other without using a separate seam (i.e., seamlessly connected to each other). Accordingly, it may possible to decrease a conductor loss caused by the seam 1850. For instance, the second signal conducting portion 1812 and a ground conducting portion 1813 may be seamlessly and integrally manufactured. Similarly, the first signal conducting portion 1811, the conductor 1842 and the ground conducting portion 1813 may be seamlessly and integrally manufactured.

Figure 19:
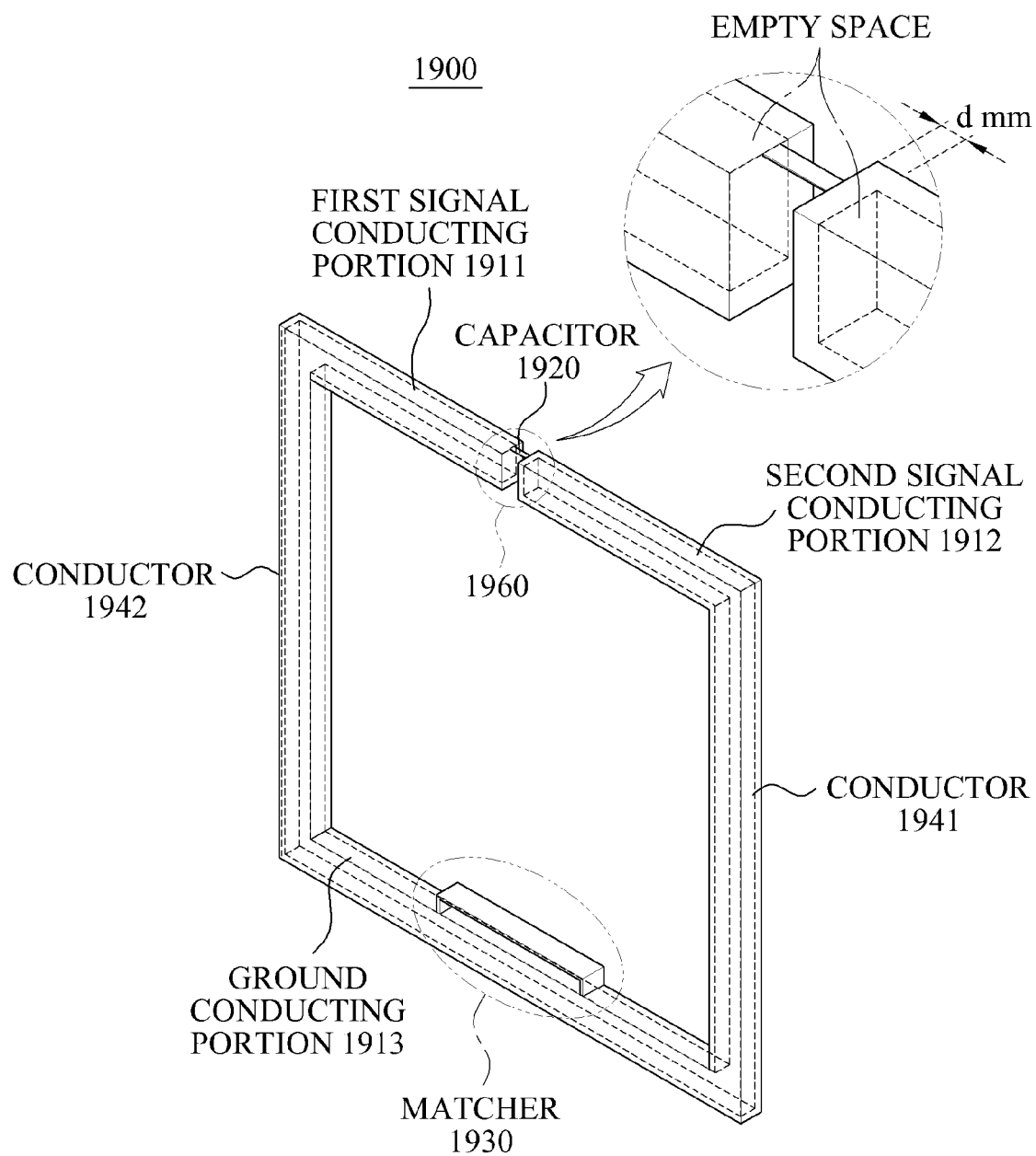

A matcher 1830 may be provided that is similarly constructed as described herein in one or more embodiments. FIG. 19 illustrates a resonator 1900 for a wireless power transmission, configured as a hollow type.

Referring to FIG. 19, each of a first signal conducting portion 1911, a second signal conducting portion 1912, a ground conducting portion 1913, and conductors 1941 and 1942 of the resonator 1900 configured as the hollow type structure. As used herein the term "hollow type" refers to a configuration that may include an empty space inside.

For a given resonance frequency, an active current may be modeled to flow in only a portion of the first signal conducting portion 1911 instead of all of the first signal conducting portion 1911, a portion of the second signal conducting portion 1912 instead of all of the second signal conducting portion 1912, a portion of the ground conducting portion 1913 instead of all of the ground conducting portion 1913, and portions of the conductors 1941 and 1942 instead of all of the conductors 1941 and 1942. When a depth of each of the first signal conducting portion 1911, the second signal conducting portion 1912, the ground conducting portion 1913, and the conductors 1941 and 1942 is significantly deeper than a corresponding skin depth in the predetermined resonance frequency, such a structure may be ineffective. The significantly deeper depth may, however, increase a weight or manufacturing costs of the resonator 1900 in some instances.

Accordingly, for the given resonance frequency, the depth of each of the first signal conducting portion 1911, the second signal conducting portion 1912, the ground conducting portion 1913, and the conductors 1941 and 1942 may be appropriately determined based on the corresponding skin depth of each of the first signal conducting portion 1911, the second signal conducting portion 1912, the ground conducting portion 1913, and the conductors 1941 and 1942. When one or more of the first signal conducting portion 1911, the second signal conducting portion 1912, the ground conducting portion 1913, and the conductors 1941 and 1942 have an appropriate depth deeper than a corresponding skin depth, the resonator 1900 may be manufactured to be lighter, and manufacturing costs of the resonator 1900 may also decrease.

For example, as illustrated in FIG. 19, the depth of the second signal conducting portion 1912 (as further illustrated in the enlarged view region 1960 indicated by a circle) may be determined as "d" mm, and d may be determined according to $$d = \frac{1}{\sqrt{\pi f \mu \sigma}}.$$

Here, f denotes a frequency, µ denotes a magnetic permeability, and σ denotes a conductor constant. In one implementation, when the first signal conducting portion 1911, the second signal conducting portion 1912, the ground conducting portion 1913, and the conductors 1941 and 1942 are made of a copper and they may have a conductivity of $5.8 \times 10^7$ siemens per meter ($S \cdot m^{-1}$), the skin depth may be about 0.6 mm with respect to 10 kHz of the resonance frequency, and the skin depth may be about 0.006 mm with respect to 100 MHz of the resonance frequency.

A capacitor 1920 and a matcher 1930 may be provided that are similarly constructed as described herein in one or more embodiments.

Figure 20:
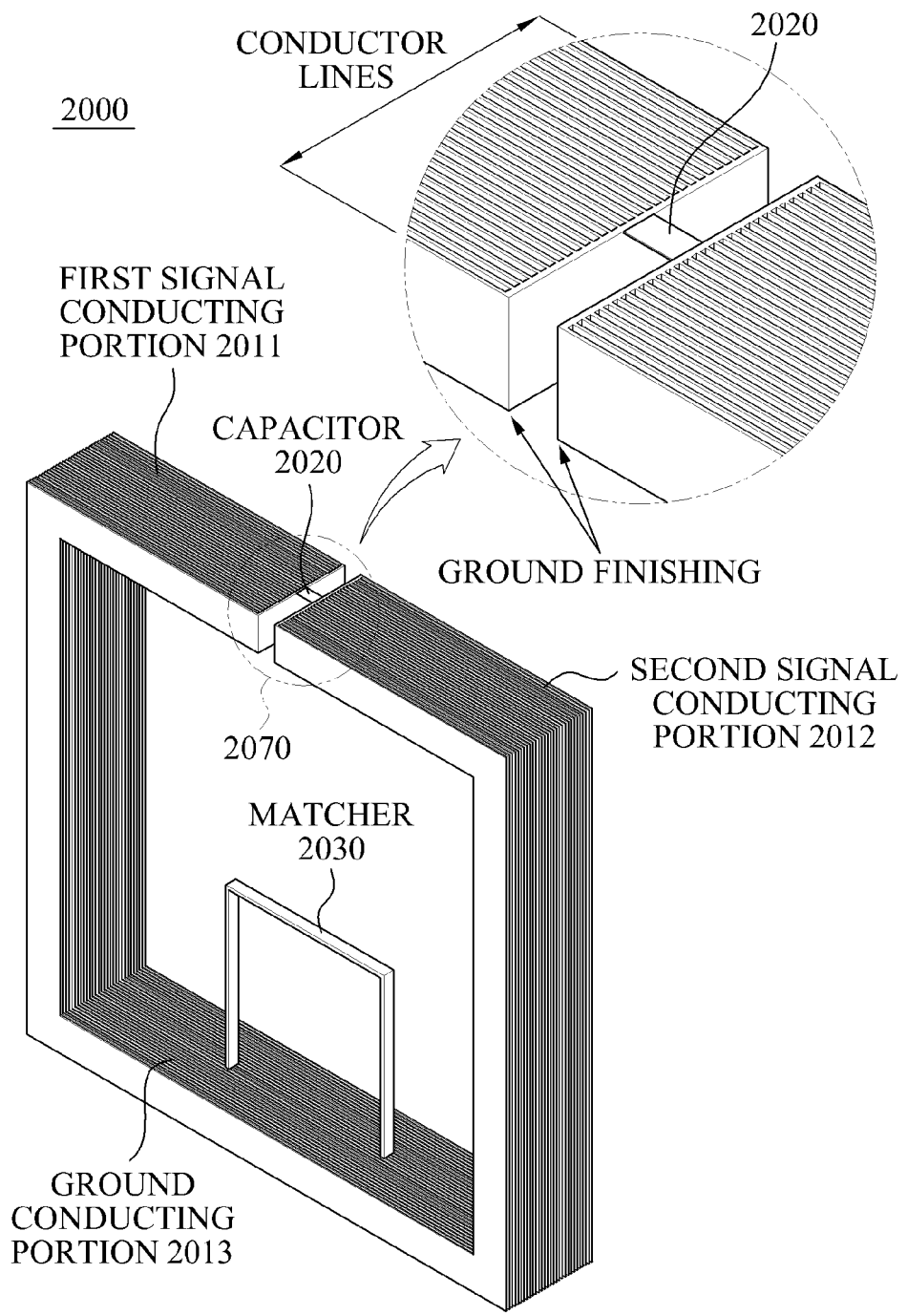

FIG. 20 illustrates a resonator 2000 for a wireless power transmission using a parallel-sheet configuration.

Referring to FIG. 20, the parallel-sheet configuration may be applicable to each of a first signal conducting portion 2011 and a second signal conducting portion 2012 included in the resonator 2000.

The first signal conducting portion 2011 and/or the second signal conducting portion 2012 may not be perfect conductors, and thus may have an inherent resistance. Due to this resistance, an ohmic loss may occur. The ohmic loss may decrease a Q-factor and may also decrease a coupling effect.

By applying the parallel-sheet configuration to each of the first signal conducting portion 2011 and the second signal conducting portion 2012, it may be possible to decrease the ohmic loss, and to increase the Q-factor and the coupling effect. Referring to the enlarged view portion 2070 (indicated by a circle in FIG. 20), each of the first signal conducting portion 2011 and the second signal conducting portion 2012 may include a plurality of conductor lines. The plurality of conductor lines may be disposed in parallel, and may be electrically connected (i.e., shorted) at an end portion of each of the first signal conducting portion 2011 and the second signal conducting portion 2012.

When the parallel-sheet configuration is applied to one or both of the first signal conducting portion 2011 and the second signal conducting portion 2012, the plurality of conductor lines may be disposed in parallel. Accordingly, the sum of resistances having the conductor lines may decrease. Consequently, the resistance loss may decrease, and the Q-factor and the coupling effect may increase.

A capacitor 2020 and a matcher 2030 positioned on the ground conducting portion 2013 may be provided that are similarly constructed as described herein in one or more embodiments.

Figure 21:
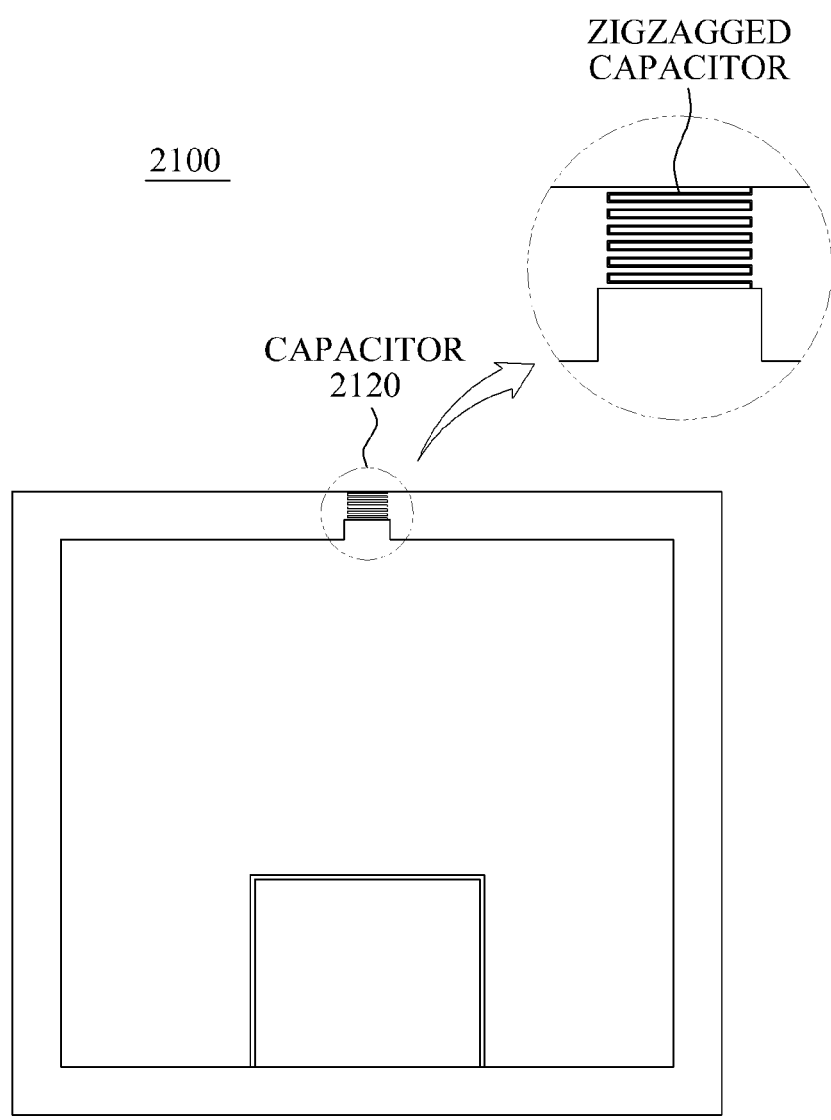

FIG. 21 illustrates a resonator 2100 for a wireless power transmission including a distributed capacitor.

Referring to FIG. 21, a capacitor 2120 included in the resonator 2100 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 2120 as a distributed element, it may be possible to decrease the ESR. As will be appreciated, a loss caused by the ESR may decrease a Q-factor and a coupling effect.

As illustrated in FIG. 21, the capacitor 2120 may be configured as a conductive line having the zigzagged structure.

By employing the capacitor 2120 as the distributed element, it may be possible to decrease the loss occurring due to the ESR in some instances. In addition, by disposing a plurality of capacitors as lumped elements, it is possible to decrease the loss occurring due to the ESR. Since a resistance of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF each instead of using a single capacitor of 10 pF, it may be possible to decrease the loss occurring due to the ESR in some instances.

Figure 22A:
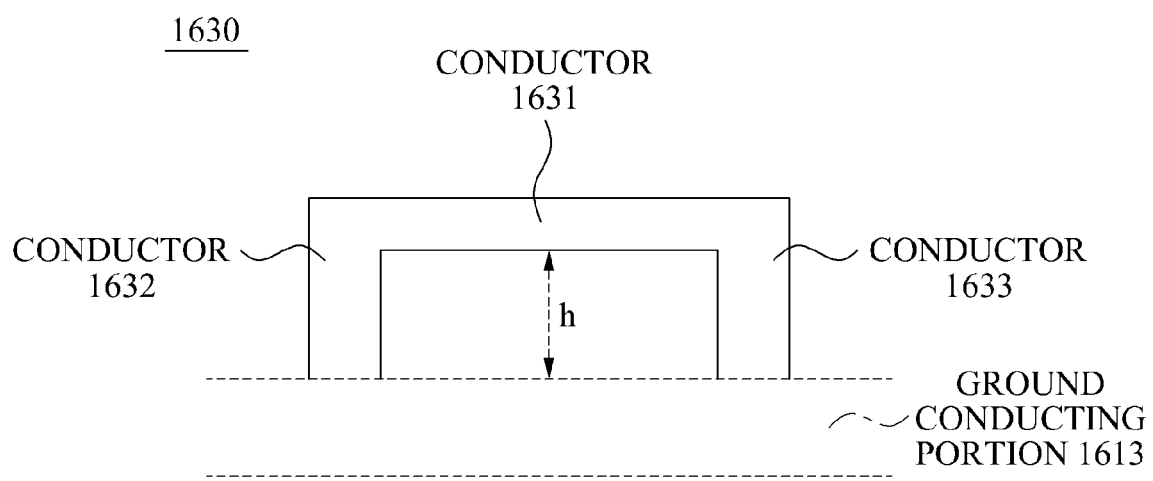
Figure 22B:
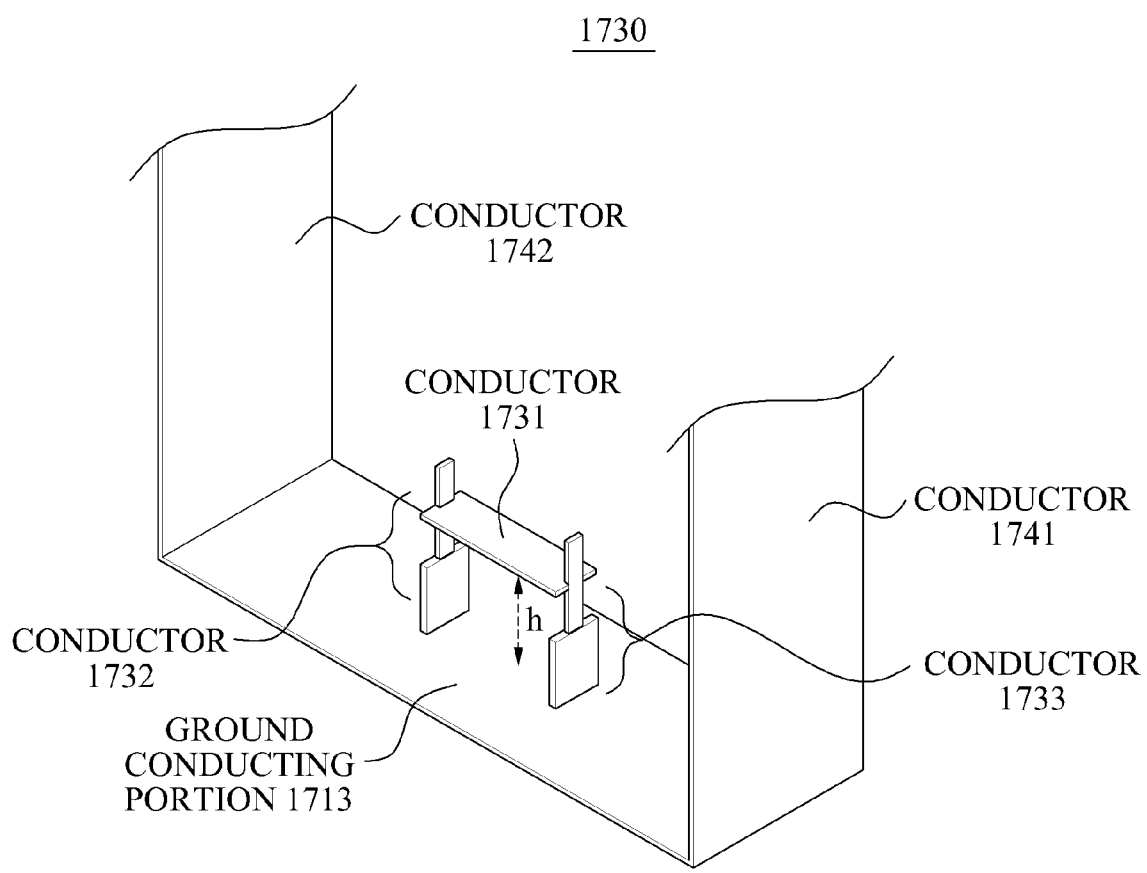

FIG. 22A illustrates one embodiment of the matcher 1630 used in the resonator 1600 illustrated in FIG. 16, and FIG. 22B illustrates an example of the matcher 1730 used in the resonator 1700 illustrated in FIG. 17.

FIG. 22A illustrates a portion of the resonator 1600 of FIG. 16 including the matcher 1630, and FIG. 22B illustrates a portion of the resonator 1700 of FIG. 17 including the matcher 1730.

Referring to FIG. 22A, the matcher 1630 may include the conductor 1631, a conductor 1632, and a conductor 1633. The conductors 1632 and 1633 may be connected to the ground conducting portion 1613 and the conductor 1631. The impedance of the 2D resonator may be determined based on a distance h between the conductor 1631 and the ground conducting portion 1613. The distance h between the conductor 1631 and the ground conducting portion 1613 may be controlled by the controller. The distance h between the conductor 1631 and the ground conducting portion 1613 may be adjusted using a variety of schemes. For example, the variety of schemes may include one or more of the following: a scheme of adjusting the distance h by adaptively activating one of the conductors 1631, 1632, and 1633, a scheme of adjusting the physical location of the conductor 1631 up and down, and/or the like.

Referring to FIG. 22B, the matcher 1730 may include the conductor 1731, a conductor 1732, a conductor 1733 and conductors 1741 and 1742. The conductors 1732 and 1733 may be connected to the ground conducting portion 1713 and the conductor 1731. The impedance of the 3D resonator may be determined based on a distance h between the conductor 1731 and the ground conducting portion 1713. The distance h between the conductor 1731 and the ground conducting portion 1713 may be controlled by the controller, for example. Similar to the matcher 1630 illustrated in FIG. 22A, in the matcher 1730, the distance h between the conductor 1731 and the ground conducting portion 1713 may be adjusted using a variety of schemes. For example, the variety of schemes may include one or more of the following: a scheme of adjusting the distance h by adaptively activating one of the conductors 1731, 1732, and 1733, a scheme of adjusting the physical location of the conductor 1731 up and down, and the like.

In some implementations, the matcher may include an active element. Thus, a scheme of adjusting an impedance of a resonator using the active element may be similar to the examples described above. For example, the impedance of the resonator may be adjusted by changing a path of a current flowing through the matcher using the active element.

Figure 23:
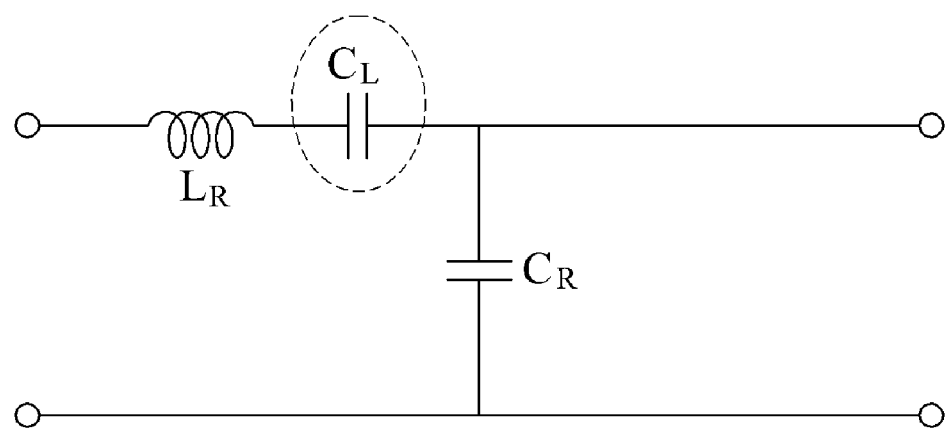
FIG. 23 is a diagram illustrating one equivalent circuit of the resonator of FIG. 16.

FIG. 23 illustrates one equivalent circuit of the resonator 1600 of FIG. 16.

The resonator 1600 of FIG. 16 used in wireless power transmission may be modeled to the equivalent circuit of FIG. 23. In the equivalent circuit depicted in FIG. 23, $L_R$ denotes an inductance of the power transmission line, $C_L$ denotes the capacitor 1620 that is inserted in a form of a lumped element in the middle of the power transmission line, and $C_R$ denotes a capacitance between the power transmissions and/or ground of FIG. 16.

In some instances, the resonator 1600 may have a zeroth resonance characteristic. For example, when a propagation constant is "0", the resonator 1600 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \qquad \text{[Equation 1]}$$

In Equation 1, MZR denotes a Mu zero resonator.

Referring to Equation 1, the resonance frequency $\omega_{MZR}$ of the resonator 1600 may be determined by $L_R/C_L$. A physical size of the resonator 1600 and the resonance frequency $\omega_{MZR}$ may be independent with respect to each other. Since the physical sizes are independent with respect to each other, the physical size of the resonator 1600 may be sufficiently reduced.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, executed by a resonance power transmitter, of controlling resonance power transmission, the method comprising:
    transmitting resonance power to a resonance power receiver, the resonance power having a different resonance frequency for each of a plurality of time intervals, and transmitting information about an amount of the resonance power and an identification of a resonance frequency, in each of the plurality of time intervals; and
    receiving, in a notification initiated by the resonance power receiver, an identification of the resonance frequency having the highest power transmission efficiency among the transmitted resonance frequencies, wherein the resonance frequency having the highest power transmission efficiency is detected by the resonance power receiver, based on the transmitted resonance power.

2. The method of claim 1, further comprising detecting the resonance power receiver.

3. The method of claim 1, further comprising:
    generating, after receiving the identification of the resonance frequency having the highest power transmission efficiency, additional resonance power using the resonance frequency having the highest power transmission efficiency; and
    transmitting the generated additional resonance power to the resonance power receiver.

4. The method of claim 1, wherein one or more of the resonance frequencies used in the time intervals are determined by scanning a frequency characteristic of a reflected wave, are determined based on a channel of a predetermined width, or are randomly determined in a predetermined bandwidth.

5. A method, executed by a resonance power transmitter, of controlling resonance power transmission, the method comprising:
    determining an order of a plurality of resonance power receivers;
    transmitting a first resonance power to a first resonance power receiver of the plurality of resonance power receivers, based on the determined order, the first resonance power having a different resonance frequency for each of a plurality of time intervals, and transmitting information about an amount of the first resonance power and an identification of the first resonance frequency, in each of the plurality of time intervals;
    receiving, in a notification initiated by the first resonance power receiver, an identification of a first resonance frequency having the highest power transmission efficiency for the first resonance power receiver among the transmitted resonance frequencies used in the time intervals;
    transmitting a second resonance power to a second resonance power receiver of the plurality of resonance power receivers, based on the determined order, the second resonance power having a different resonance frequency for each of a plurality of time intervals; and
    receiving, in a notification initiated by the second resonance power receiver, an identification of a second resonance frequency having the highest power transmission efficiency for the second resonance power receiver among the transmitted resonance frequencies used in the time intervals, wherein each of the first resonance frequency and the second resonance frequency is detected by the resonance power receiver, based on the transmitted resonance power.

6. The method of claim 5, further comprising detecting the plurality of resonance power receivers.

7. The method of claim 5, further comprising:
    generating, after receiving the identification of the first resonance frequency having the highest power transmission efficiency, additional first resonance power using the first resonance frequency, and transmitting the additional first resonance power generated using the first resonance frequency to the first resonance power receiver; and
    generating, after receiving the identification of the second resonance frequency having the highest power transmission efficiency, additional second resonance power using the second resonance frequency, and transmitting the additional second resonance power generated using the second resonance frequency to the second resonance power receiver.

8. The method of claim 5, further comprising:
    generating, after receiving the identification of the first resonance frequency having the highest power transmission efficiency, additional first resonance power using the first resonance frequency, and transmitting the additional first resonance power generated using the first resonance frequency to the first resonance power receiver;
    determining whether charging of the first resonance power receiver is completed; and
    generating, after receiving the identification of the second resonance frequency having the highest power transmission efficiency, additional second resonance power using the second resonance frequency, and transmitting the additional second resonance power generated using the second resonance frequency to the second resonance power receiver, when the charging of the first resonance power receiver is completed.

9. The method of claim 5, further comprising:
generating, after receiving the identification of the first resonance frequency having the highest power transmission efficiency, additional first resonance power using the first resonance frequency, and transmitting the additional first resonance power generated using the first resonance frequency to the first resonance power receiver;
determining whether a report message is received from the first resonance power receiver within a predetermined period of time of transmitting the additional first resonance power; and
generating, after receiving the identification of the second resonance frequency having the highest power transmission efficiency, additional second resonance power using the second resonance frequency, and transmitting the additional second resonance power generated using the second resonance frequency to the second resonance power receiver, when the report message is not received within the predetermined period of time.

10. The method of claim 5, wherein one or more of the resonance frequencies used in the first and second time intervals are determined by scanning a frequency characteristic of a reflected wave, are determined based on a channel of a predetermined width, or are randomly determined in a predetermined bandwidth.

11. A method, executed by a resonance power receiver, of controlling resonance power reception, the method comprising:
receiving resonance power from a resonance power transmitter, the resonance power having a different resonance frequency for each of a plurality of time intervals;
receiving, from the resonance power transmitter, a message identifying the resonance frequency and resonance power transmitted, in each of the time intervals;
detecting a resonance frequency having the highest power transmission efficiency among the resonance frequencies used in the time intervals, based on the identified resonance frequency and resonance power transmitted in each of the time intervals; and
notifying the resonance power transmitter of the identity of the detected resonance frequency upon its detection.

12. The method of claim 11, further comprising receiving, from the resonance power transmitter, additional resonance power generated using the detected resonance frequency.

13. The method of claim 12, further comprising:
determining whether charging of the resonance power receiver is completed; and
notifying the resonance power transmitter of a completion of the charging of the resonance power receiver, when the charging of the resonance power receiver is completed.

14. A resonance power transmitter comprising:
a resonance power generator configured to generate resonance power, wherein the resonance frequency of the resonance power differs for each of a plurality of time intervals;
a source resonator configured to transmit the resonance power to a resonance power receiver; and
a communication unit configured to receive, in a notification initiated by the resonance power receiver, an identification of the resonance frequency having the highest power transmission efficiency among the transmitted resonance frequencies, and an identification of an amount of resonance power, in each of the plurality of time intervals,
wherein the resonance frequency having the highest power transmission efficiency is detected by the resonance power receiver, based on the transmitted resonance power.

15. The resonance power transmitter of claim 14, further comprising a detector configured to detect the resonance power receiver.

16. The resonance power transmitter of claim 14, wherein:
the resonance power generator is configured to generate additional resonance power using the resonance frequency having the highest power transmission efficiency, and
the source resonator is configured to transmit the generated additional resonance power to the resonance power receiver.

17. The resonance power transmitter of claim 14, wherein one or more of the resonance frequencies used in the time intervals are determined by scanning a frequency characteristic of a reflected wave, are determined based on a channel of a predetermined width, or are randomly determined in a predetermined bandwidth.

18. A resonance power receiver comprising:
a target resonator configured to receive resonance power from a resonance power transmitter, the resonance power having a different resonance frequency for each of a plurality of time intervals;
a communication unit configured to receive, from the resonance power transmitter, a message identifying the resonance frequency and resonance power transmitted, in each of the time intervals; and
a target controller configured to detect a resonance frequency having the highest power transmission efficiency among the resonance frequencies used in the time intervals, based on the identified resonance frequency and resonance power transmitted in each of the time intervals,
wherein the communication unit is configured to transmit, in a notification to the resonance power transmitter, an identification of the detected resonance frequency upon its detection.

19. The resonance power receiver of claim 18, wherein the target resonator is further configured to receive, from the resonance power transmitter, additional resonance power generated using the detected resonance frequency.

20. The resonance power receiver of claim 18, wherein, when charging of the resonance power receiver is completed, the target controller is configured to notify the resonance power transmitter of a completion of the charging of the resonance power receiver.

21. The method of claim 1, further comprising notifying the resonance power receiver of identities of the resonance frequencies used in the time intervals and of the amount of the resonance power transmitted in one or more of the time intervals.

22. The method of claim 2, wherein the detecting comprises:
receiving an identifier (ID) of the resonance power receiver; and
recognizing the resonance power receiver, based on the received ID.

23. The method of claim 1, wherein the time intervals comprise preset or predetermined time intervals.

* * * * *